United States Patent
Raz

(10) Patent No.: US 12,189,563 B1
(45) Date of Patent: Jan. 7, 2025

(54) RETRY REGULATOR FOR TRANSACTIONS OF AN INTEGRATED CIRCUIT

(71) Applicant: Amazon Technologies, Inc., Seattle, WA (US)

(72) Inventor: Moshe Raz, Pardesiya (IL)

(73) Assignee: Amazon Technologies, Inc., Seattle, WA (US)

( * ) Notice: Subject to any disclaimer, the term of this patent is extended or adjusted under 35 U.S.C. 154(b) by 280 days.

(21) Appl. No.: 17/937,143

(22) Filed: Sep. 30, 2022

(51) Int. Cl.
*G06F 13/40* (2006.01)
*G06F 13/16* (2006.01)

(52) U.S. Cl.
CPC ...... *G06F 13/4027* (2013.01); *G06F 13/1668* (2013.01); *G06F 2213/0038* (2013.01)

(58) Field of Classification Search
CPC ............ G06F 13/4027; G06F 13/1668; G06F 2213/0038
See application file for complete search history.

(56) References Cited

U.S. PATENT DOCUMENTS

| | | | | |
|---|---|---|---|---|
| 6,728,808 B1 * | 4/2004 | Brown | ................ | G06F 13/423 710/110 |
| 11,768,630 B1 * | 9/2023 | Avron | ................ | G06F 13/1668 711/154 |
| 2003/0088692 A1 * | 5/2003 | Badovinatz | ........... | H04L 47/193 709/237 |
| 2007/0277059 A1 * | 11/2007 | Ogawa | ................ | G11B 20/18 714/54 |
| 2016/0342549 A1 * | 11/2016 | Hathorn | ................ | G06F 3/067 |
| 2017/0262227 A1 * | 9/2017 | Bradbury | ................ | G06F 3/061 |
| 2021/0026554 A1 * | 1/2021 | Turner | ................ | G06F 3/061 |
| 2021/0058335 A1 * | 2/2021 | Ringe | ................ | H04L 47/6225 |

* cited by examiner

*Primary Examiner* — Nimesh G Patel
(74) *Attorney, Agent, or Firm* — Weaver Austin Villeneuve & Sampson LLP

(57) ABSTRACT

Systems and methods are provided to improve system performance when multiple transaction retry events associated with transaction requests from requester nodes to completer nodes are detected. A retry monitor can monitor the transaction retry events associated with the transaction requests to provide retry information. An intervention level generator can receive information about the transaction retry events and determine an intervention level from a plurality of intervention levels based on the retry information and a retry configuration. Each requester node can be coupled to a regulator to regulate the transactions being requested by that requester node based on the intervention level and a regulator configuration, which can allow the corresponding completer nodes to complete the outstanding transactions and reduce the occurrence of retry events.

24 Claims, 12 Drawing Sheets

RETRY REGULATOR FOR TRANSACTIONS OF AN INTEGRATED CIRCUIT

BACKGROUND

In some computing systems, a plurality of requester nodes may communicate with a plurality of completer nodes via one or more interconnect fabrics. In some cases, when a requester node sends a transaction request to a completer node, the completer node may not be able to accept the transaction request due to lack of resources. In this case, the completer node may allocate a credit to the requester node to retry sending the transaction request at a later time. When the completer node has the resources to accept the transaction request, the completer node may send a retry grant response to the requester node, which can allow the requester node to resend the transaction request using the allocated credit. In this case, the completer node will accept the transaction request with the credit.

BRIEF DESCRIPTION OF THE DRAWINGS

Various embodiments in accordance with the present disclosure will be described with reference to the drawings, in which.

DETAILED DESCRIPTION

Figure 1:
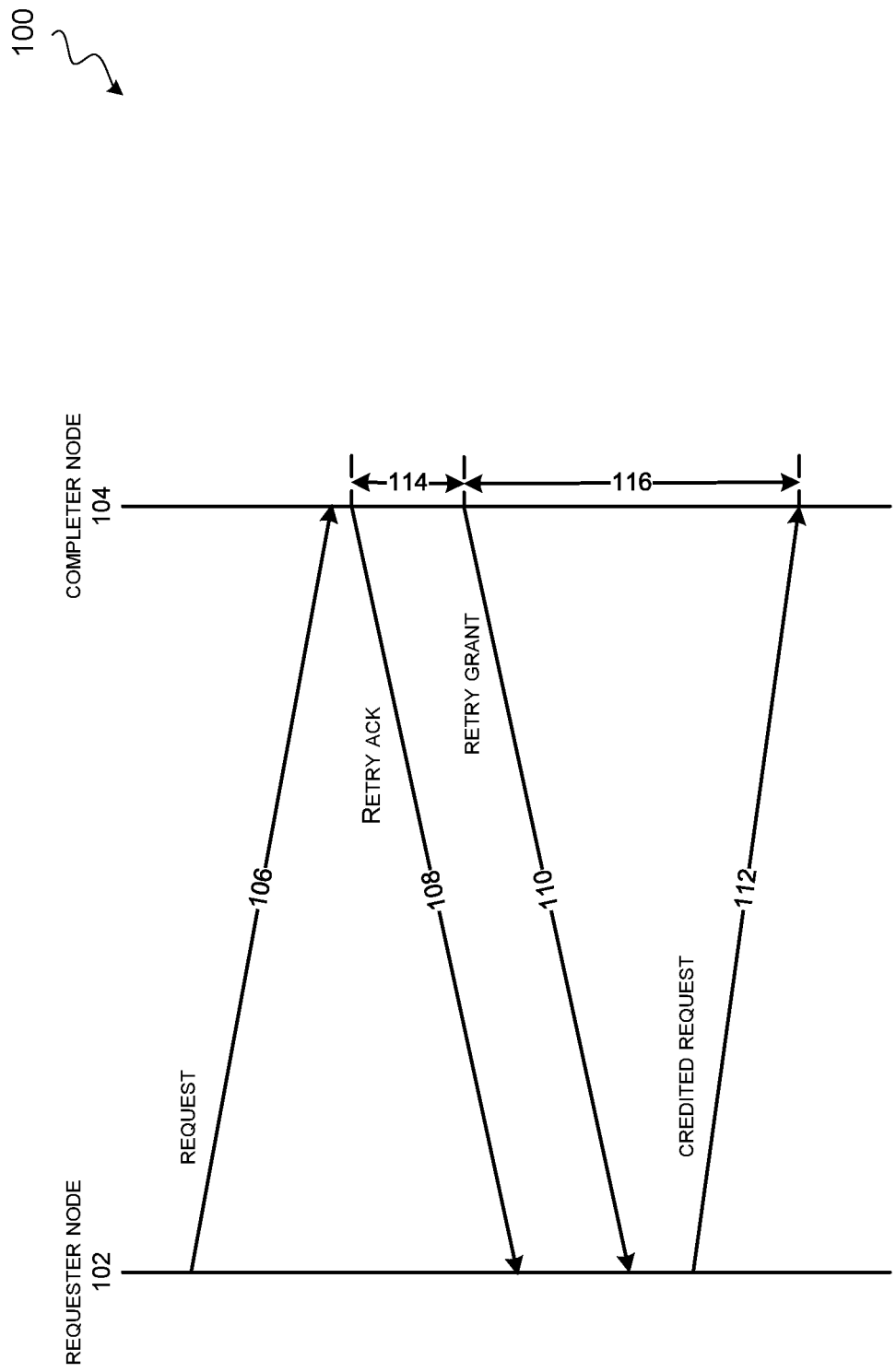
FIG. 1 illustrates example communication messages between a requester node and a completer node based on a retry protocol.

Some systems may include a plurality of nodes that can communicate with one another via one or more interconnect fabrics, such as, bridges, switches, hubs, crossbars, mesh, or a combination thereof. Any of the plurality of nodes can operate as a requester node or a completer node at different times of operation based on whether the node is initiating a transaction request or is completing a transaction request. The requester node may also be called a source node or a transmitter node, and the completer node may also be called a target node, a destination node, or a receiver node. The plurality of nodes may include processors, peripheral devices, coprocessors (e.g., graphics processing units (GPUs), accelerator engines, cryptographic engines), direct memory access (DMA) controllers, memory devices, input/output (I/O) controllers, or other suitable integrated circuit (IC) devices. The interconnect fabrics may be based on any suitable bus protocol, e.g., Advanced High Performance Bus (AMBA) coherent hub interface (CHI) protocol, Advanced extensible Interface (AXI) protocol, AMBA High Performance Bus (AHB) protocol, AMBA Peripheral Bus (APB) protocol, etc.

In some systems, the interconnect fabric may include a home node that can operate as a completer node for some of the nodes and operate as a requester node for some of the other nodes. The home node may receive multiple transaction requests from various requester nodes and buffer the transactions before forwarding them to the corresponding destinations. As an example, a processor can operate as a requester node that sends a transaction request to write data to a memory device. The transaction request may be received by the home node in the interconnect fabric that is operating as a completer node for the processor. The home node in the interconnect fabric is also operating as a requester node to forward the transaction to the memory device acting as a completer node.

In some instances, a completer node may not be able to accept a transaction request from a requester node. For example, the completer node may not accept a transaction request when it has insufficient storage resources to hold the transaction request. In some cases, the completer node may encounter backpressure from other downstream nodes, and may be holding outstanding transaction requests in a buffer and may not have sufficient storage resources to hold additional transaction requests. Furthermore, in some systems, the number of requester nodes connected to a home node may be more that the number of completer nodes that can serve the requester nodes, which can also increase the backpressure. In these cases, the completer node may respond to the requester node with a retry acknowledgement (ack) response indicating that it is not able to accept the transaction request at this point in time. The retry ack response may imply that a credit is allocated to the requester node, which can be used by the requester node in the future to retry sending this transaction request when it is guaranteed to be accepted by the completer node. In some instances, as the backpressure increases, the completer node may keep rejecting the transaction requests since the storage resources may be occupied with the outstanding transaction requests, and the number of credited requests may keep increasing which can reduce the system bandwidth.

When the completer node has sufficient resources to accept a transaction request which has been allocated a credit (e.g., once some of the outstanding transactions have been completed), the completer node may send a retry grant response to the requester node. Upon receiving the retry grant response, the requester node can send a credited request with an indication that it has been allocated a credit to resend the transaction request, which will be accepted by the completer node. When the completer node sends the retry grant response to the requester node, the completer node has the resources to process the original transaction request. However, until the requester node sends a credited request for the transaction using the allocated credit, the storage resources allocated to that transaction request in the completer node are idle and not being used. In some instances, there may be multiple credited requests issued for different transaction requests and multiple resources may be waiting for the credited transaction requests to arrive, which can degrade system performance since each credited request may introduce additional communication overhead, thus, increasing the transaction latency. In some cases, when there are a large number of pending retries, the system may reach a point where the bandwidth drops significantly because the system is bottlenecked with a backlog of pending retries, and the system performance degrades dramatically.

Techniques are described to detect the backpressure from the completer node and regulate the transaction requests sent by the requester node to prevent performance degradation due to a backlog of pending retries. In some embodiments, a retry monitor can be used to monitor various transaction retry events associated with the transaction requests and generate retry indications based on those events. The transaction retry events may include the retry ack response sent by the completer node, the retry grant response sent by the completer node, and the credited request sent by the requester node. The retry monitor can be configured to monitor the transaction retry events at the requester node or at the completer node, and can provide retry indications to an intervention level generator. The intervention level generator can generate an intervention level from a plurality of intervention levels which can be used by a regulator coupled to the requester node to regulate the transactions being requested by the requester node. The regulator can regulate the number of transactions being requested by the requester node by limiting the link credits allocated to the requester node for sending the transaction requests based on the intervention level.

In some implementations, a plurality of requester nodes and completer nodes may be distributed in the system via multiple interconnect fabrics. In some implementations, each requester node may be coupled to a respective retry monitor, which can monitor the transaction retry events at that requester node and provide retry indications to a dedicated intervention level generator. Each dedicated intervention level generator can provide an intervention level from a plurality of intervention levels based on the respective retry indications to the regulator coupled to the corresponding requester node. The intervention level may indicate the amount of intervention needed to regulate the transactions being requested by that requester node. In some other implementations, each completer node may be coupled to a respective retry monitor, which can monitor the transaction retry events at that completer node and provide retry indications to a central intervention level generator. The central intervention level generator can provide a respective intervention level from a plurality of intervention levels to each regulator coupled to the corresponding requester node. In some implementations, a combination of dedicated intervention level generators and central intervention level generators can be used for the plurality of requester nodes and completer nodes.

In some embodiments, the retry monitor may monitor the retry ack responses, retry grant responses, and the credited requests to provide the retry information to the intervention level generator. The intervention level generator may include a plurality of interval counters to count various retry events for each interval window that corresponds to a pre-determined number of cycles. The interval counters may include separate counters for the retry ack response, the retry grant response, and the credited request. The intervention level generator may also include a plurality of combination counters to count combinations of different retry events, which may reflect the status of the resources in the completer node. A first combination counter can be incremented with each retry ack response and decremented with each retry grant response, a second combination counter can be incremented with each retry grant response and decremented with each credited request, and a third combination counter can be incremented with each retry ack response and decremented with each credited request.

The intervention level generator may determine an intervention level from a plurality of intervention levels based on the comparisons of various interval counters and the combination counters with corresponding threshold values, as well as the comparison of an external intervention level received from another intervention level generator. The plurality of intervention levels may include 2 or more intervention levels. In some implementations, a first intervention level may indicate no intervention is needed, a second intervention level may indicate low intervention is needed, a third intervention level may indicate medium intervention is needed, and a fourth intervention level may indicate high intervention is needed. The intervention level may be upgraded or downgraded from one level to another based on the comparisons with corresponding pre-configured threshold values for each level. For each level, the threshold to upgrade from the current level to the next level can be different than the threshold to downgrade from the next level to the current level. In other words, a hysteresis can be employed for intervention level transitions.

In some embodiments, the rate of transactions can be controlled by controlling the link credits that are allocated to a requester node to allow sending transactions to a completer node. Generally, the link credits are allocated to the requester node for transmitting packets to the completer node over a link (or communication channel). In some embodiments, the regulator can receive the link credits that are being sent to the requester node, and control the delivery of the link credits to the requester node based on the intervention level. For example, the regulator can hold on to the link credits to prevent the requester node to send new transactions if there are already a number of outstanding transactions, and forward the link credits to the requester node at a later point in time. The number of link credits that are held back can be increased in proportion to the increasing intervention level.

The regulator can monitor the transaction requests issued by the requester node and compare the number of transaction requests sent within each interval window corresponding to a pre-determined number of cycles. The regulator can compare the number of sent requests with a threshold value and determine whether the rate of transactions have to be controlled using a rate limiter, or the transactions have to be blocked within that interval window based on the comparison. In some cases, the regulator may provide the link credits to the requester node to prevent deadlock or performance degradation if the transaction request is a credited request, which can allow the credited request to go through and is not counted as the sent request. Thus, by holding the link credits based on the intervention level, the bandwidth taken up by the requester node can be controlled.

In some instances, when the number of transaction requests and the retry grant responses are high, the requester node cannot be prevented from sending non-credited transactions while the credited requests are being sent. In such cases, the intervention level can be used to change the configuration of the rate limiter, which controls the input to the requester node, to prevent the requester node from sending any new transactions based on the input. Thus, the outstanding requests can be completed first, which can free up the storage resources to process the credited requests.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiments being described.

FIG. 1 illustrates example communication messages 100 between a requester node 102 and a completer node 104 based on a retry protocol.

In some examples, the requester node 102 and the completer node 104 may be part of an integrated circuit (IC) device comprising a plurality of nodes. Any number of the plurality of nodes may operate as a requester node and/or as a completer node at different times of operation based on the functionality supported by the IC device. For example, the plurality of nodes may include processors, peripheral devices, graphics processing units (GPUs), accelerators, crypto engines, direct memory access (DMA) controllers, memory devices, input/output (I/O) controllers, or other suitable devices. A requester node can include a circuit that can send transaction requests, and a completer node can include a circuit that can respond to the transaction requests. A transaction request may include a request to write or read data, response message, or other control messages. Each transaction may include a source identifier (ID), a target ID, a transaction ID, address, data size, opcode, and/or other relevant fields.

Different nodes of the IC device may communicate with one another using one or more interconnects that may be based on any suitable bus protocol, e.g., Advanced High Performance Bus (AMBA) Coherent Hub Interface (CHI) protocol, Advanced extensible Interface (AXI) bus protocol, AMBA High Performance Bus (AHB) protocol, AMBA Peripheral Bus (APB) protocol, etc. The interconnects may include switches, bridges, hubs, meshes, matrices, crossbar, etc. The IC device can be part of a system-on-a-chip (SoC), System-in-a-Package (SiP), a System-On-Module (SOM), etc.

As shown in FIG. 1, the requester node 102 may send a request 106 for a transaction to the completer node 104 via an interconnect. As an example, the requester node 102 may send a request to write to a memory device that is also coupled to the interconnect. The requester node 102 can be a processor, and the completer node 104 can be a home node in the interconnect, which may be coupled to the memory device. The home node may operate as a completer node for the processor, and operate as a requester node for the memory device operating as a completer node. For example, the requester node 102 can be the home node, and the completer node 104 can be the memory device. In some examples, requester node 102 may communicate with the completer node 104 using on the CHI protocol. For example, the requester node 102 can be a requester node (RN), and the completer node 104 can be a home node (HN), or the requester node 102 can be the HN, and the completer node 104 can be a subordinate node (SN). The HN can be part of the interconnect (ICN) comprising a fabric of switches connected in a ring, crossbar, mesh, or other suitable topology.

In some instances, the completer node 104 may not accept the request 106 and respond with a retry ack 108 indicating that the request 106 should be sent at a later point in time. Generally, the completer node 104 may decline the request 106 when it has insufficient resources (e.g., memory or buffer space) to process the transaction request until some outstanding transactions have completed. In some examples, the completer node 104 may encounter backpressure from other downstream nodes, and may be holding outstanding transaction requests in a buffer and may not have sufficient storage space to hold additional transaction requests. Furthermore, in some systems, the number of requester nodes connected to a home node may be more that the number of completer nodes that can serve the requester nodes, which can also increase the backpressure.

The completer node 104 may store some information associated with the request 106 and assign protocol credits that can be provided in the retry ack response 108. When the completer node 106 has the storage resources available at a later point in time (e.g., after completing some outstanding transactions), the completer node 106 may send a retry grant response 110 to the requester node 102 indicating that the transaction request can be retried. The retry grant response 110 may include the protocol credits assigned to the request 106. Upon receiving the retry grant response 110, the requester 102 can send a credited request 112 to the completer 104 using the allocated protocol credits. The completer 104 then accepts the credited request 112 for the transaction with the credit (also called a credited transaction).

As shown in FIG. 1, a time duration 114 between sending the retry ack response 108 and the retry grant response 110, and a time duration 116 between sending the retry grant response 110 and receiving the credited request 112, can increase the transaction latency. Furthermore, the time duration 116 during which the retry grant response 110 has been sent out but the credited request 112 has not been received, the storage resources allocated to the request 106 are idle or not being used. When there are multiple retry events (e.g., the retry ack 106, retry grant 110, and the credited request 112) for different transaction requests going through the system, the efficiency of the system may drop since multiple storage resources may be waiting for the corresponding credited transactions to arrive, which can degrade the system performance. Furthermore, the system performance can drop dramatically when there are too many credited transactions to process.

The techniques described here can be used to detect the backpressure from the completer node 104 and regulate the transaction requests sent by the requester node 102 in order to prevent the system from reaching the point where the performance begins to degrade dramatically. This is further described with reference to FIGS. 2A-2C.

Figure 2A:
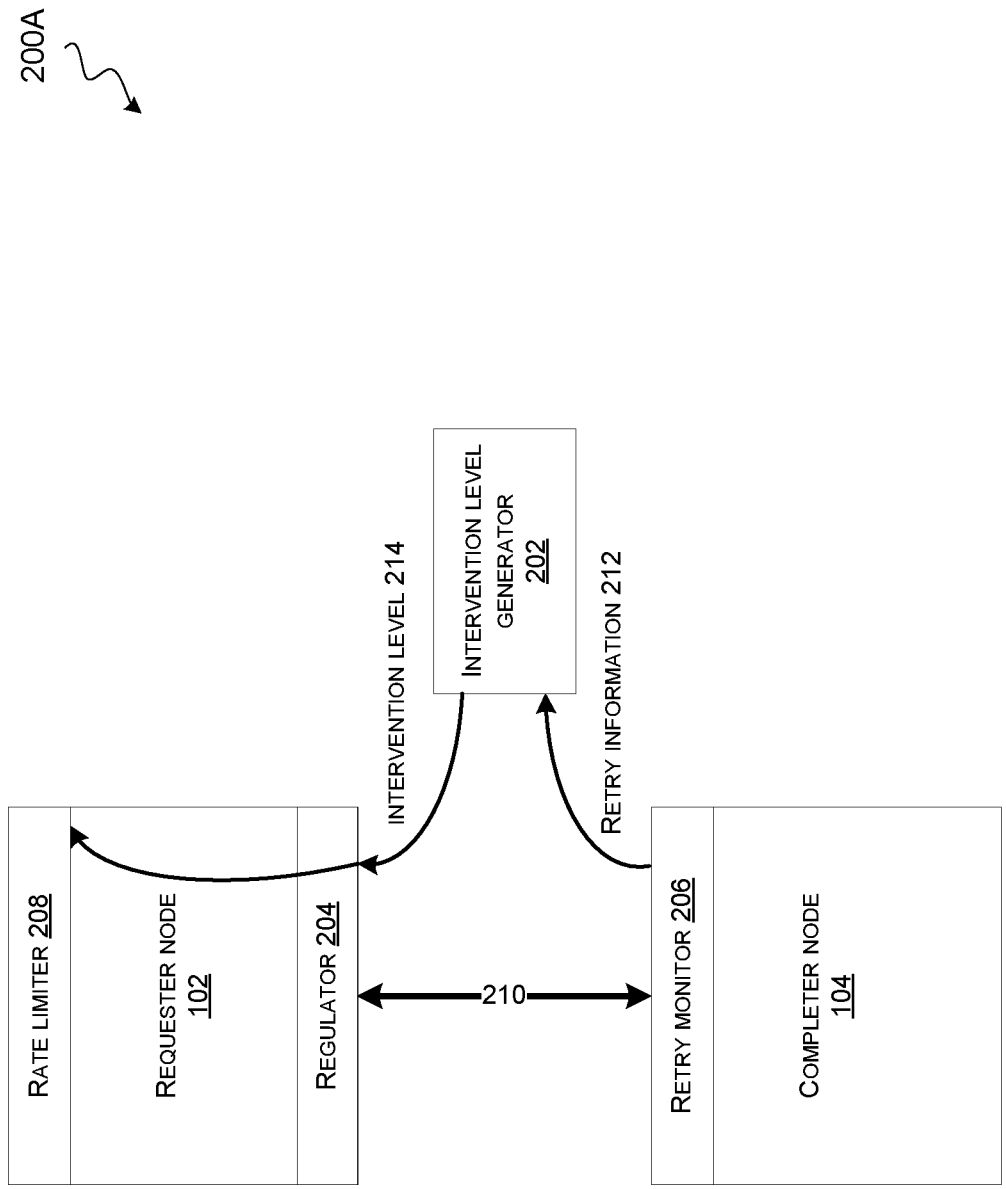
FIG. 2A illustrates an apparatus comprising components for regulating the transaction requests between the requester node and the completer node with an intervention level generator, in accordance with some embodiments.

FIG. 2A illustrates an apparatus 200A comprising components for regulating the transaction requests between the requester node 102 and the completer node 104, in accordance with some embodiments. In some examples, the apparatus 200A may be part of an IC device, described with reference to FIG. 1.

The requester node 102 may be configured to send transaction requests to the completer code 104 via an interconnect 210. The interconnect 210 may include an interconnect fabric comprising switches, routers, bridges, mesh, crossbars, etc. The requester node 102 may be coupled to a regulator 204 and a rate limiter 208. The completer node 104 may be coupled to a retry monitor 206. An intervention level generator 202 may be coupled to each of the regulator 204 and the retry monitor 206.

In some embodiments, the completer node 104 can be a home node and may operate as a requester node for another completer node. In this example, another intervention level generator may be coupled to a regulator in the home node and to a retry monitor in the other completer node. The intervention level generator 202 may also be coupled the other intervention level generator to regulate the flow of transactions on both sides of the home node based on the retry events between each set of requester and completer nodes. This is further explained with reference to FIG. 3.

Referring back to FIG. 2A, the retry monitor 206 may be configured to monitor transaction retry events at the completer node 104. For example, the transaction retry events may include the retry ack 108 sent by the completer node 104 in response to the transaction request 106, the retry grant response 110 sent by the completer node 104 after sending the retry ack response 108, and the credited request 112 for the transaction sent by the requester node 104 after receiving the retry grant response 110. The retry monitor 206 may be further configured to provide retry information 212 associated with the transaction requests to the intervention level generator 202. The retry information 212 may include information associated with the retry ack 108, retry ack response 108, and the credited request 112 of the transaction requests. For example, the retry information 212 may indicate the type of the event, timing of the event, the transaction information, and/or any other relevant information.

The intervention level generator 202 may be configured to receive the retry information 212 from the retry monitor 206 and determine an intervention level 214 from a plurality of intervention levels based on the retry information 212 and a retry configuration. The intervention level generator 202 may include an interval pulse generator to generate an interval pulse at a periodic interval (e.g., at every predetermined number of cycles). The intervention level generator 202 may count the number of retry acks, retry ack responses, and the credited requests using corresponding interval counters during each interval window that is represented by the difference between two consecutive interval pulses. Values of the interval counters are saved at the end of each interval window and the interval counters get reset for the next iteration.

The intervention level generator 202 may also be configured to count combinations of different retry events using respective combination counters. Each combination counter can be incremented by one retry event and decremented by another retry event. For example, a first combination counter may be incremented for each retry ack response and decremented for each retry grant response indicating that a retry ack was sent by the completer nodes. Referring back to FIG. 1, the first combination counter may be incremented when the retry ack response 108 is sent and decremented when the retry grant response 110 is sent. The intervention level generator 202 may also increment a second combination counter for each retry grant response and decrement for each credited request indicating that the storage resources at the completer node 104 are waiting for the credited transactions to arrive. Referring back to FIG. 1, the second combination counter may be incremented when the retry grant response 110 is sent and decremented when the credited request 112 is received. The intervention level generator 202 may also increment a third combination counter for each retry ack response and decrement for each credited request indicating that the retry for the transaction request is in process. Referring back to FIG. 1, the third combination counter may be incremented when the retry ack response 108 is sent and decremented when the credited request 112 is received.

The intervention level generator 202 may determine whether an intervention level 214 has to be upgraded or downgraded based on the comparison of each of the interval counters and the combination counters with a corresponding threshold value based on the retry configuration. For example, if the intervention level is not at the highest intervention level in the plurality of intervention levels, the intervention level is upgraded to the next level if any of the counters is greater than a corresponding upgrade threshold value. If the intervention level is not at the lowest intervention level (e.g., 0) in the plurality of intervention levels, the intervention level is downgraded to a level below if any of the counters is less than a corresponding downgrade threshold.

In some embodiments, the intervention level generator 202 may receive an external intervention level from another intervention level generator which is configured to communicate with the intervention level generator 202. The intervention level generator 202 may also be configured to upgrade or downgrade the intervention level if the external intervention level from the other intervention level generator is greater than a corresponding upgrade threshold or if the intervention level from the other intervention level generator is less than a corresponding downgrade threshold. The intervention level generator 202 may provide the final intervention level 214 to the regulator 204.

The regulator 204 may be configured to receive the intervention level 214 from the intervention level generator 202 and regulate the transactions being requested by the requester node 102 based on the intervention level 214 and a regulator configuration. The regulator configuration may include different threshold/configuration values that are specific to the regulator 204. In some embodiments, the regulator 204 may be configured to regulate the transactions being requested by the requester node 102 by controlling the link credits allocated to the requester node 102 for issuing new transactions. The regulator 204 may be configured to control the link credits based on the intervention level 214 and the regulator configuration. For example, the regulator 204 may receive the link credits from a switch (cross-point) in the interconnect 210 and may determine whether to forward the link credits to the requester node 102 or to hold on to the link credits until the requester node 102 is allowed to send new transaction requests.

The regulator 204 may also include an interval pulse generator which can generate an interval pulse every predefined number of cycles. The regulator 204 may count the number of requests sent by the requester node 102 including the credited transaction requests (e.g., credited request 112) from the start of each interval window that is represented by the difference between two consecutive interval pulses. The regulator 204 may compare the number of sent transactions with a threshold value and determine whether to activate or deactivate the rate limiter 208, change the configuration of the rate limiter 208, block the transactions till the end of the interval window, or do nothing based on the comparison. Thus, the regulator 204 can control the transactions being requested by the requester node 102 by releasing the credits in a controlled manner based on the outstanding transactions, the number of sent transactions within an interval window, and the regulator configuration.

The rate limiter 208 may be configured to regulate a rate of transactions arriving at the requester node 102 based on the intervention level 214. As an example, the requester node 102 may receive the transactions from other nodes that are coupled to the requester node 102 via a different interconnect. For example, the requester node 102 can be a processor which may be coupled to a peripheral device, or a DMA engine via another interconnect that is based on the AXI, AHB, or APB bus protocol. In some examples, the rate of transactions arriving at the requester node 102 from the other interconnect may need to be controlled to support the regulator 204 with regulating the transactions requested by the requester node 102 to the completer node 104.

Thus, limiting the new transactions requested by the requester node using the rate limiter 208, when the resources at the completer node 104 are not available and any new transaction requests from the requester node 102 can cause retry events at the completer node 104, can allow the completer node 104 to complete the outstanding transactions so that the retry events for the new transactions can be minimized.

Figure 2B:
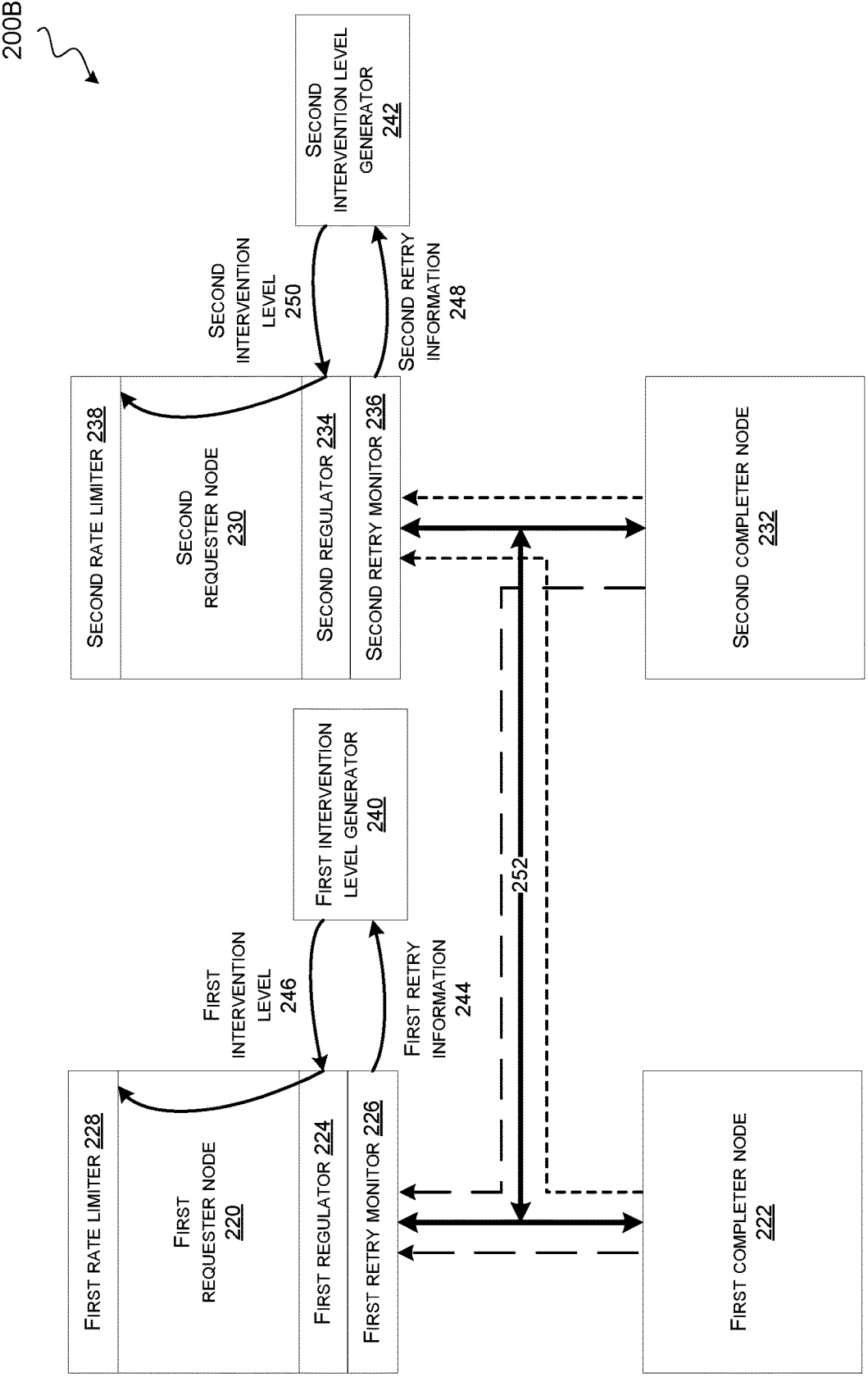
FIG. 2B illustrates an apparatus comprising components for regulating the transaction requests between multiple requester nodes and completer nodes with a dedicated intervention level generator for each requester node, in accordance with some embodiments.

FIG. 2B illustrates an apparatus 200B comprising components for regulating the transaction requests between multiple requester nodes and completer nodes with a dedicated intervention level generator for each requester node, in accordance with some embodiments.

The apparatus 200B may include a first requester node 220 configured to send transaction requests to a first completer node 222 and a second completer node 232 via an interconnect 252, and a second requester node 230 configured to send transaction requests to the first completer node 222 and the second completer node 232 via the interconnect 252. The first requester node 220 and the second requester node 230 may be similar to the requester node 102, the first completer node 222 and the second completer node 232 may be similar to the completer node 104, and the interconnect 252 may be similar to the interconnect 210. In some examples, the apparatus 200B may be part of an IC device, described with reference to FIG. 1.

In some embodiments, a first retry monitor circuit 226 may be configured to monitor the transaction retry events at the first requester node 220 and provide a first retry information 244, and a second retry monitor circuit 236 may be configured to monitor the transaction retry events at the second requester node 230 and provide a second retry information 248. For example, the transaction retry events at the first requester node 220 may include the transaction requests sent by the first requester node 220 to the first completer node 222 and to the second completer node 232, retry ack and retry grant responses received from the first completer node 222 and the second completer node 232, and the credited requests sent by the first requester node 220 to the first completer node 222 and to the second completer node 232. Similarly, the transaction retry events at the second requester node 230 may include the transaction requests sent by the second requester node 230 to the first completer node 222 and to the second completer node 232, retry ack and retry grant responses received from the first completer node 222 and the second completer node 232, and the credited requests sent by the second requester node 230 to the first completer node 222 and to the second completer node 232.

A first intervention level generator 240 can be a dedicated intervention level generator of a first regulator circuit 224 of the first requester node 220, and a second intervention level generator 242 can be a dedicated intervention level generator of a second regulator circuit 234 of the second requester node 234. The first intervention level generator 240 may be configured to receive the first retry information 244 from the first retry monitor circuit 226 and provide a first intervention level 246 from a plurality of intervention levels to the first regulator circuit 224 based on the first retry information 244 and a first retry configuration. The second intervention level generator 242 may be configured to receive the second retry information 248 from the second retry monitor circuit 236 and provide a second intervention level 250 from a plurality of intervention levels to the second regulator circuit 234 based on the second retry information 248 and a second retry configuration.

The first requester node 220 may also be coupled to a first rate limiter circuit 228, and the second requester node 230 may also be coupled to a second rate limiter circuit 238. The first regulator circuit 224 and the second regulator circuit 234 may be similar to the regulator circuit 204, and the first rate limiter circuit 228 and the second rate limiter circuit 238 may be similar to the rate limiter circuit 208 described with reference to FIG. 2A. For example, the first regulator circuit 224 may be configured to regulate the transactions being requested by the first requester node 220 based on the first intervention level 246 and a first regulator configuration, and the second regulator circuit 234 may be configured to regulate the transactions being requested by the second requester node 230 based on the second intervention level 250 and a second regulator configuration. Furthermore, the first rate limiter circuit 228 may be configured to regulate a rate of transactions arriving at the first requester node 220 based on the first intervention level 246, and the second rate limiter circuit 238 may be configured to regulate a rate of transactions arriving at the second requester node 230 based on the second intervention level 250.

Figure 2C:
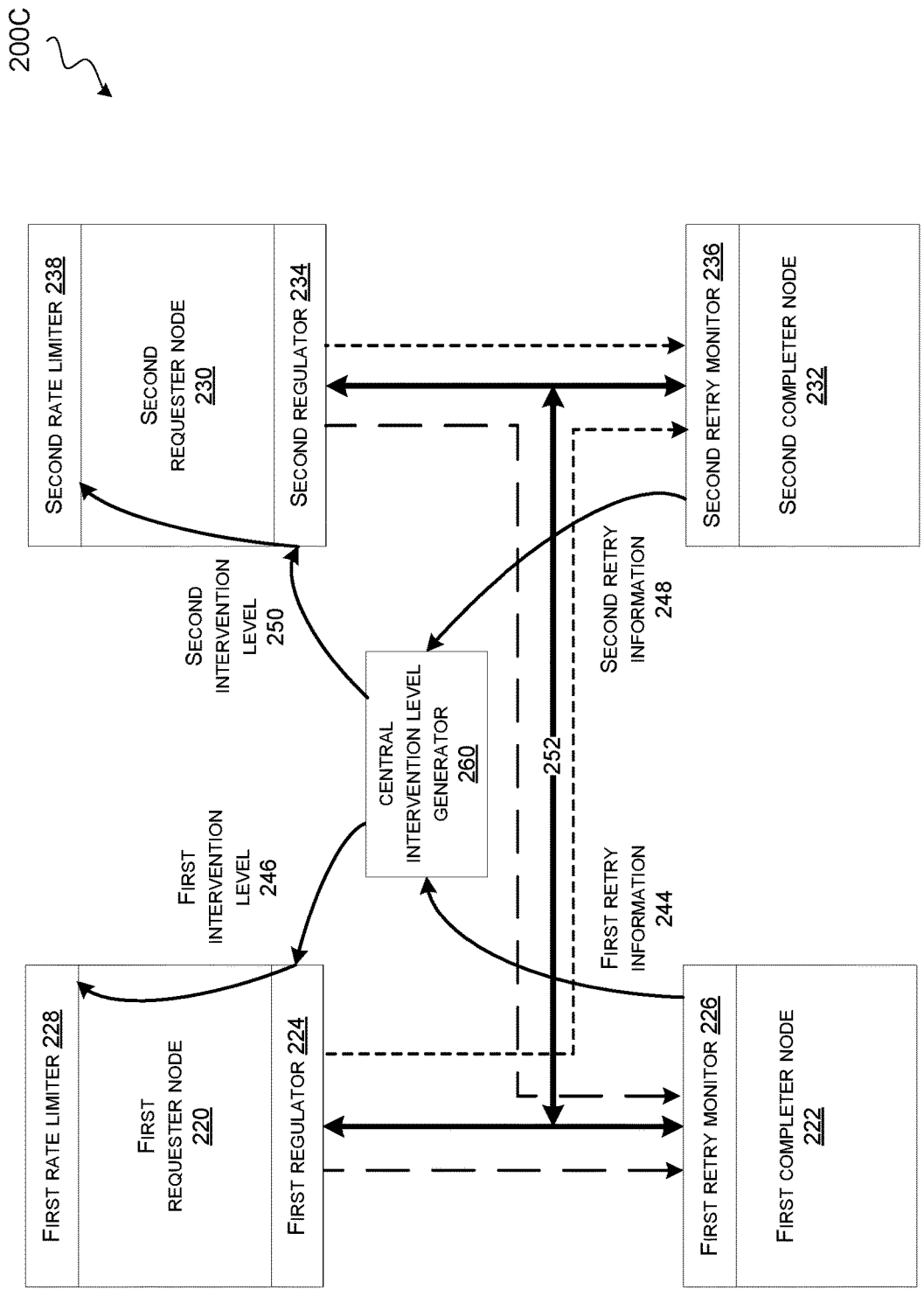
FIG. 2C illustrates an apparatus comprising components for regulating the transaction requests between multiple requester nodes and completer nodes with a central intervention level generator, in accordance with some embodiments.

FIG. 2C illustrates an apparatus 200C comprising components for regulating the transaction requests between multiple requester nodes and completer nodes with a central intervention level generator, in accordance with some embodiments. The multiple requester nodes and completer nodes may include the first requester node 220, the second requester node 230, the first completer node 222, and the second completer node 232 from FIG. 2B.

In some implementations, a retry monitor can be configured to monitor transaction retry events of the transaction requests at the completer node, and provide retry information associated with the transaction retry events to a central intervention level generator. For example, the transaction retry events at the first completer node 222 may include the transaction requests received from the first requester node 220 and the second requester node 230, retry ack and retry grant responses sent to the first requester node 220 and the second requester node 230, and the credited requests received from the first requester node 220 and the second requester node 230. Similarly, the transaction retry events at the second completer node 232 may include the transaction requests received from the first requester node 220 and the second requester node 230, retry ack and retry grant responses sent to the first requester node 220 and the second requester node 230, and the credited requests received from the first requester node 220 and the second requester node 230.

As shown in FIG. 2C, the first retry monitor 226 may be configured to provide the first retry information 244 and the second retry monitor 236 may be configured to provide the second retry information 248 to a central intervention level generator 260. The central intervention level generator 260 may be configured to receive the first retry information 244 and the second retry information 248, and provide the first intervention level 246 from a plurality of intervention levels to the first regulator circuit 224 based on the first retry information 244, the second retry information 248, and a first retry configuration, and provide the second intervention level 250 from the plurality of intervention levels to the second regulator circuit 234 based on the first retry information 244, the second retry information 248, and a second retry configuration. In some examples, the central intervention level generator 260 may also be configured to generate the first intervention level 246 and the second intervention level 250 based on an external intervention level received from another central intervention level generator.

Figure 3:
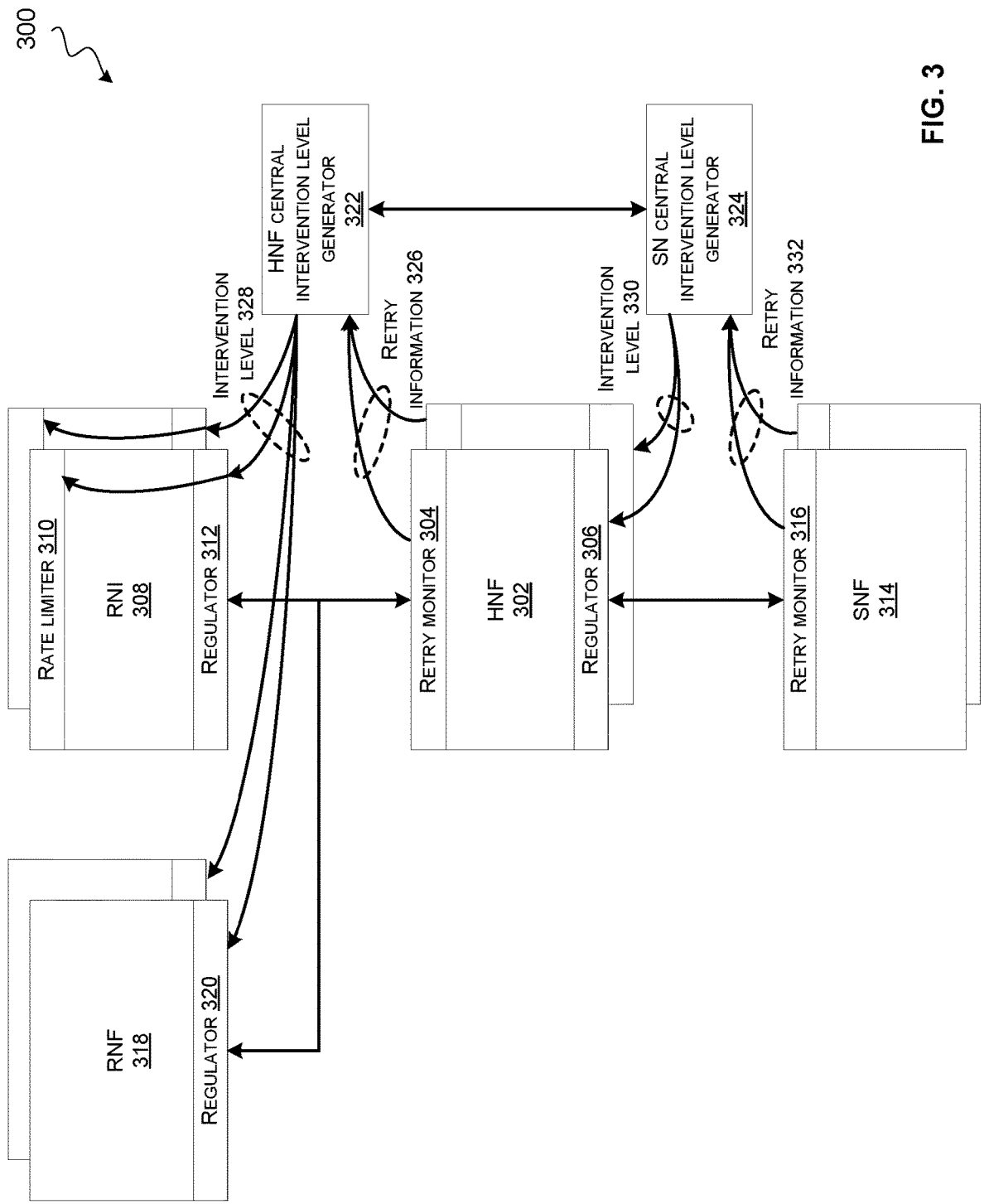
FIG. 3 illustrates an apparatus comprising a plurality of nodes coupled to one or more intervention level generators, in accordance with some embodiments.

FIG. 3 illustrates an apparatus 300 comprising a plurality of nodes coupled to one or more central intervention level generators, in accordance with some embodiments. The apparatus 300 can be part of an SoC and may include other components based on the functionality supported by the SoC.

The apparatus 300 may include a plurality of fully coherent home nodes HNFs 302 respectively coupled to a plurality of IO coherent request nodes RNIs 308, respectively coupled to a plurality of fully coherent request nodes RNFs 318, and respectively coupled to a plurality of subordinate nodes SNFs 314. In some implementations, the plurality of fully coherent home nodes HNFs 302 may be part of an interconnect fabric. Note that FIG. 3 shows an example of the SoC based on the AMBA CHI protocol. However, it will be understood that the embodiments are not limited to a specific bus protocol, and can be used with other bus protocols without deviating from the scope of the disclosure.

As an example, the RNFs 318 may include processors, and the RNIs 308 may include peripheral devices that are respectively coupled to the HNFs 302. The SNFs 314 may include memory devices that are also respectively coupled to the HNFs 302. Each of the HNFs 302 may operate as a completer node for each of the RNFs 318 and each of the RNIs 308 that is operating as a requester node, and as a requester node for each of the SNFs 314 that is operating as a completer node. In some examples, each of the RNIs 308 may be coupled to other nodes via another interconnect that is based on another bus protocol, e.g., AXI, APB, or AHB.

The plurality of HNFs 302 may be respectively coupled to a plurality of regulators 306 and a plurality of retry monitors 304. The plurality of RNIs 308 may be respectively coupled to a plurality of regulators 312 and a plurality of rate limiters 310. The plurality of RNFs 318 may be respectively coupled to a plurality of regulators 320. The plurality of SNFs 314 may be respectively coupled to a plurality of retry monitors 316. An HNF central intervention level generator 322 may be coupled to the plurality of retry monitors 304, the plurality of regulators 312, and the plurality of regulators 320. An SN central intervention level generator 324 may be coupled to the plurality of regulators 306 and the plurality of retry monitors 316. The HNF central intervention level generator 322 and the SN central intervention level generator 324 may be coupled to one another to exchange the intervention levels.

Each of the HNF central intervention level generator 322 and the SN central intervention level generator 324 may be an example of the central intervention level generator 260. Each of the plurality of retry monitors 304, and each of the plurality of retry monitors 316 may be an example of the retry monitor 206, the first retry monitor 226, or the second retry monitor 236. Each of the plurality of regulators 306, the plurality of regulators 312, and the plurality of regulators 320 may be an example of the regulator 204, the first regulator 224, or the second regulator 234. Each of the plurality of retry limiters 304 may be an example of the rate limiter 208, the first rate limiter 228, or the second rate limiter 238.

Each of the retry monitors 304 may be configured to monitor transaction retry events at a corresponding HNF 302 and provide retry information 326 associated with the transaction retry events at the corresponding HNF 302 to the HNF central intervention level generator 322. Similarly, each of the retry monitors 316 may be configured to monitor transaction retry events at a corresponding SNF 314 and provide retry information 332 associated with the transaction retry events at the corresponding SNF 314 to the SN central intervention level generator 324.

The HNF central intervention level generator 322 may determine an intervention level 328 from a plurality of intervention levels for each of the plurality of regulators 312 and 320 based on the retry information 326 received from each of the HNFs 302 and an HNF retry configuration, and send the corresponding intervention level 328 to each of the plurality of regulators 312 and 320. Similarly, the SN central intervention level generator 324 may determine an intervention level 330 from a plurality of intervention levels for each of the plurality of regulators 306 based on the retry information 332 received from each of the SNFs 314 and an SNF retry configuration, and send the corresponding intervention level 330 to each of the plurality of regulators 306. The SN central intervention level generator 324 may also send the intervention levels 330 to the HNF central intervention level generator 322, and the HNF central intervention level generator 322 may also send the intervention levels 328 to the SN central intervention level generator 324.

Each of the plurality of regulators 312 may be configured to receive the corresponding intervention level 328 from the HNF central intervention level generator 322 and regulate the transactions being requested by the corresponding RNI 308 based on the intervention level 328 and a respective RNI regulator configuration. Each of the plurality of regulators 318 may be configured to receive the corresponding intervention level 328 from the HNF central intervention level generator 322 and regulate the transactions being requested by the corresponding RNF 318 based on the intervention level 328 and a respective RNF regulator configuration. Each of the plurality of regulators 306 may be configured to receive the corresponding intervention level 330 from the SN central intervention level generator 324 and regulate the transactions being requested by the corresponding HNF 302 based on the intervention level 330 and a respective HNF regulator configuration.

Each of the plurality of rate limiters 310 may be configured to receive the intervention level 328 from the corresponding regulator 312 and regulate a rate of transactions arriving at the corresponding RNI 308 based on the intervention level 328 and a corresponding rate limiter configuration.

In various embodiments, having the HNF central intervention level generator 322 determine the intervention level 328 based on the transaction retry events between the RNFs 318/RNIs 308 and the HNFs 302, and the SN central intervention level generator 324 determine the intervention level 332 based on the transaction retry events between the HNFs 302 and the SNFs 314 can allow the corresponding regulators to regulate the transaction requests such that when the intervention level 330 is at the highest intervention level, the HNF central intervention level generator 322 can upgrade the intervention level 328 to the next higher level to limit the number of transaction requests that are arriving at the HNFs 302 so that the HNFs 302 can complete the outstanding transactions at a faster rate and release the storage resources for the new transaction requests and reduce the retry requests. Furthermore, when the intervention levels 330 and 328 are approaching the highest level of intervention, the rate limiter 310 configuration can be updated to limit higher number of transactions arriving at the RNIs 308 to allow the HNFs 302 complete outstanding transaction requests and relieve the backpressure. Thus, regulating the transaction requests using separate central intervention level generators can allow completion of the outstanding requests quickly, which can reduce the number of retry requests before the system reaches a failing point.

Note that FIG. 3 is described using the central intervention level generators; however, it should be noted that the techniques described herein can be used to support a combination of dedicated and central intervention level generators to regulate the transactions requests from a plurality of requester nodes to a plurality of completer nodes in an IC device. For example, in some implementations, instead of the HNF central intervention level generator 322, a dedicated intervention level generator can be used for each of the regulators 320 and 312, similar to the first intervention level generator 240 and the second intervention level generator 242 described with reference to FIG. 2B. Alternatively, in some implementations, instead of the SN central intervention level generator 324, a dedicated intervention level generator can be used for each of the regulators 306.

Figure 4:
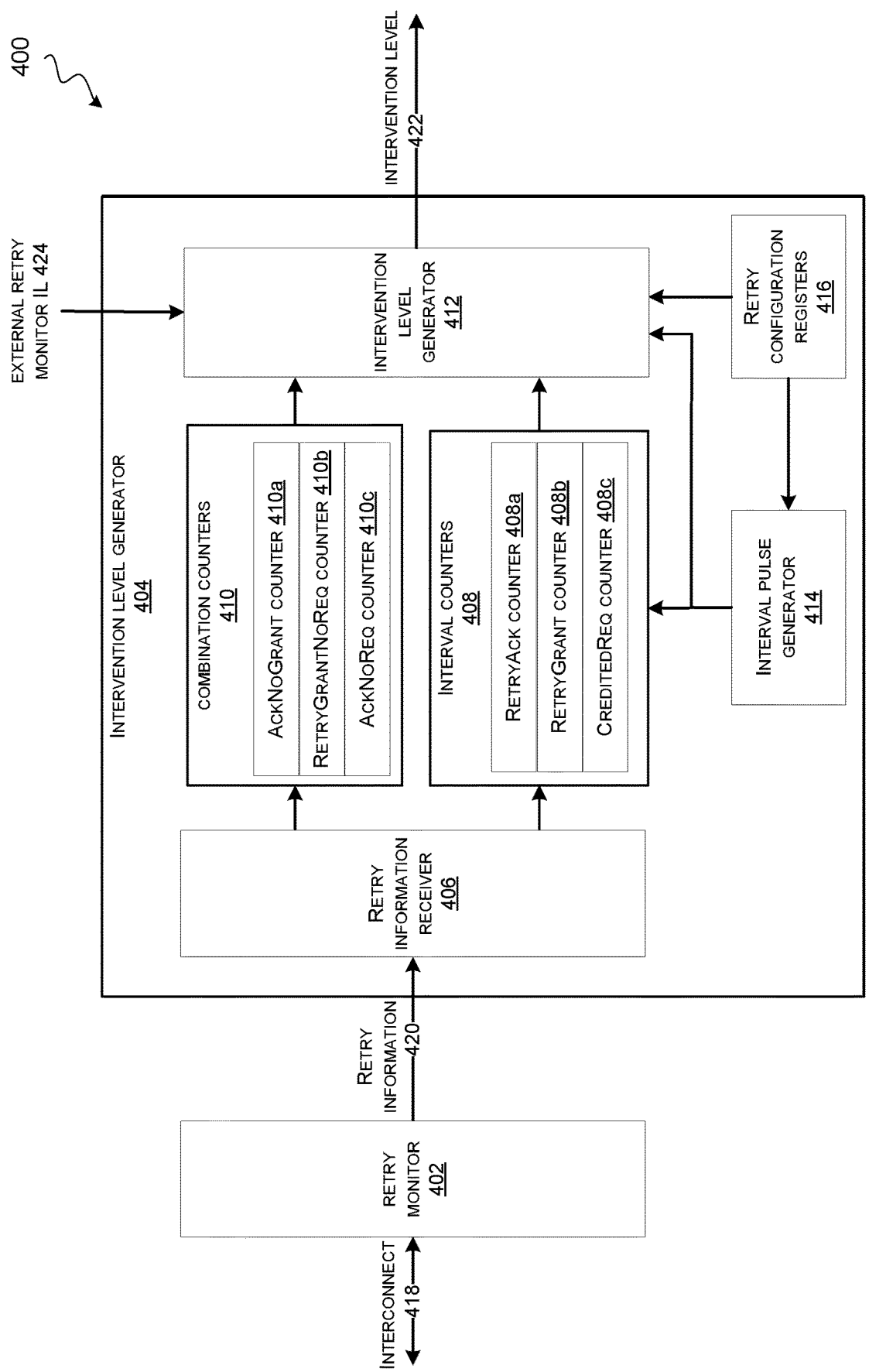
FIG. 4 illustrates an apparatus comprising circuits for a retry monitor coupled to a intervention level generator, in some embodiments.

FIG. 4 illustrates an apparatus 400 comprising circuits for a retry monitor 402 coupled to an intervention level generator 404, in some embodiments. The retry monitor 402 can be an example of the retry monitor 206, and the intervention level generator 404 can be an example of the intervention level generator 202 in FIG. 2A, the first intervention level generator 240 or the second intervention level generator 242 in FIG. 2B, or the central intervention level generator 260 in FIG. 2C. In some examples, the apparatus 400 can be part of an SoC described with reference to FIG. 3, and a first intervention level generator 404 can be used for the HNF central intervention level generator 322 and a second intervention level generator 404 can be used for the SN central intervention level generator 324.

The intervention level generator 202 may include a retry information receiver 406, interval counters 408, combination counters 410, an intervention level generator 412, an interval pulse generator 414, and retry configuration registers 416. The interval counters 408 may include a RetryAck counter 408a, a RetryGrant counter 408b, and a CreditedReq counter 408c. The combination counters 410 may include an AckNoGrant counter 410a, a RetryGrantNoReq counter 410b, and an AckNoReq counter 410c.

The retry information receiver 406 may be configured to receive retry information 420 from the retry monitor 402, similar to the retry information 212. The retry monitor 402 may be configured to passively monitor the interconnect 418 to identify transaction retry events associated with the transaction requests at a requester node or a completer node. For example, the transaction retry events may include the retry ack 108, the retry grant response 110, and the credited request 112 associated with the transaction request 106 sent by the requester node 104. The interconnect 418 may be part of an interconnect fabric comprising switches, meshes, bridges, etc. The retry monitor 402 may provide the retry information 420 to the intervention level generator 404 based on the transaction retry events. Note that the intervention level generator 404 may receive the corresponding retry information 420 from each of the retry monitors coupled to the intervention level generator 404, as described with reference to FIGS. 2C, and 3.

The retry configuration registers 416 may include a plurality of configuration registers which may be programmed by the system software with different threshold values, and/or configuration values used by different components of the intervention level generator 404.

The interval pulse generator 414 may be configured to generate an interval pulse at a periodic interval, as described with reference to FIG. 5.

Figure 5:
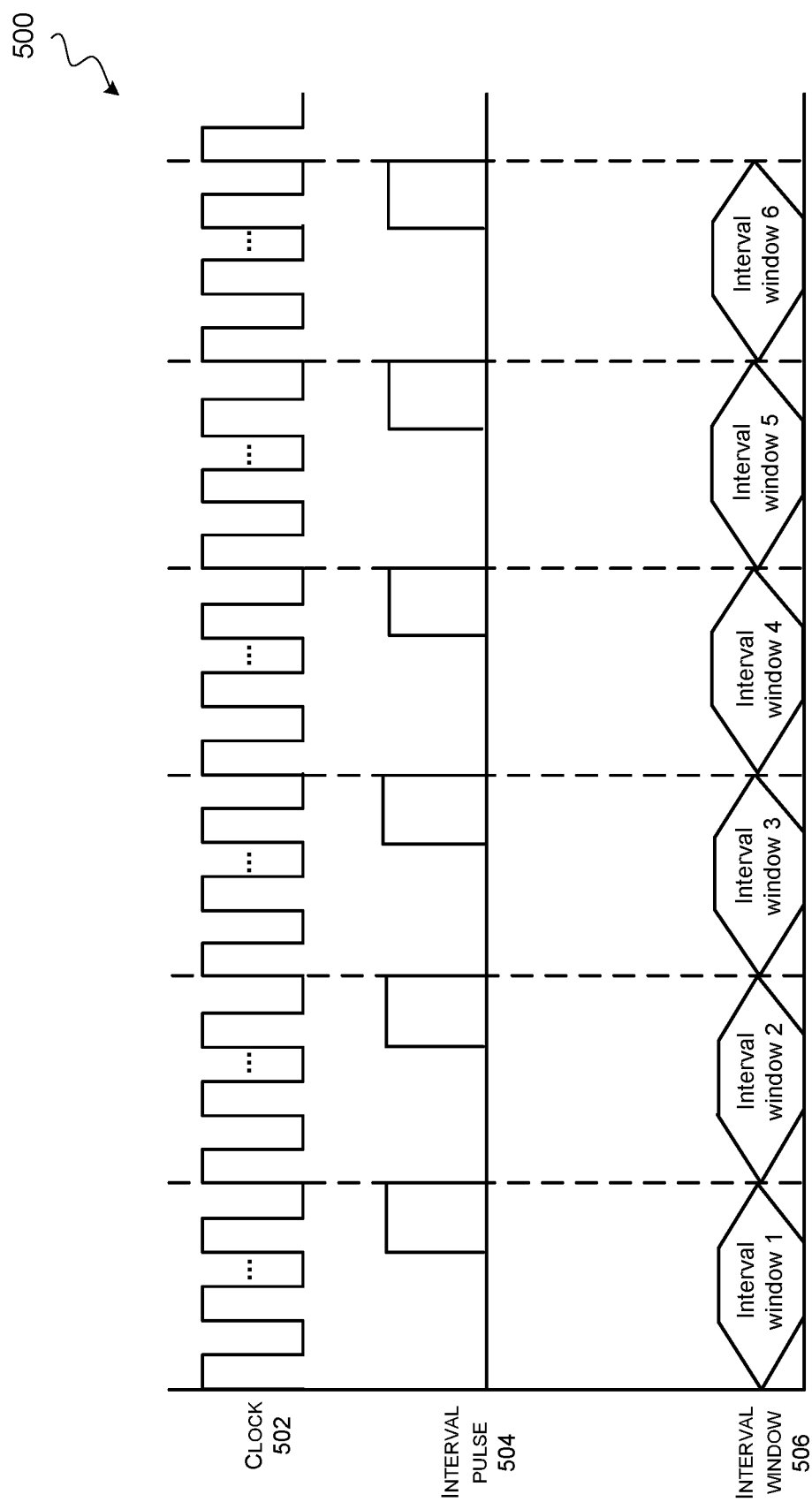
FIG. 5 illustrates a timing diagram for generation of the interval pulses in some embodiments.

FIG. 5 illustrates a timing diagram 500 for generation of the interval pulses in some embodiments.

As shown in FIG. 5, the interval pulse generator 414 may generate an interval pulse 504 every pre-determined number of cycles of a clock 502 based on an interval configuration. For example, the interval configuration may be programmed in one of the retry configuration registers 416 indicating the number of cycles for generating the interval pulse 504. The time elapsed between the falling edge of two consecutive interval pulses 504 may represent an interval window 506 as shown in FIG. 5, e.g., an interval window 1, and interval window 2, an interval window 3, an interval window 4, an interval window 5, an interval window 6, and so on.

Referring back to FIG. 4, the interval counters 408 may be configured to count various retry events based on the retry information 420 and the interval pulse 504 generated by the interval pulse generator 414. Each of the interval counters may be reset at the end of each interval pulse 504 or at the start of the interval window 506, and copied to a corresponding shadow register at the end of the interval window 506 to be used by the intervention level generator 412. The RetryAck counter 408a may be configured to count the number of retry acks that were sent by each completer node or received by each requester node during a given interval window, the RetryGrant counter 408b may be configured to count the number of retry grant responses that were sent by each completer node or received by each requester node during the given interval window, and the CreditedReq counter 408c may be configured to count the number of credited requests that were received by each completer node or sent by each requester node during the given interval window.

The combination counters 410 may be configured to count combinations of different retry events based on the retry information 420, which can reflect the status of the resources in the completer node. Each of the AckNoGrant counter 410a, the RetryGrantNoReq counter 410b, and the AckNoReq counter 410c may be incremented for one of the retry events and decremented for another of the retry events. For example, the AckNoGrant counter 410a may be incremented for each retry ack response and decremented for each retry grant response indicating that a retry ack was sent by the corresponding completer node. The RetryGrantNoReq counter 410b may be incremented for each retry grant response and decremented for each credited request indicating that the storage resources at the corresponding completer node are waiting for the credited transaction to arrive. The AckNoReq counter 410c may be incremented for each retry ack response and decremented for each credited request indicating that the retry for the transaction request is in process.

The intervention level generator 412 may be configured to generate an intervention level 422 from a plurality of intervention levels based on the interval counters 408, the combination counters 410, the retry configuration registers 416, and an external retry monitor intervention level (IL) 424. Note that the external retry monitor IL 424 may be generated by another central intervention level generator as described with reference to FIG. 3. In some examples, the plurality of intervention levels may include a zero intervention level indicating that no intervention is needed, a first intervention level indicating that low intervention is needed, a second intervention level indicating that medium intervention is needed, and a third intervention level indicating that high intervention is needed. In some other examples, more or fewer number of intervention levels can be used.

The intervention level generator 412 may be configured to upgrade or downgrade the intervention level 422 by one level at a time, at the end of each interval window. This is further described with reference to FIG. 6. The intervention level 422 can be upgraded based on an Equation 1 or downgraded based on an Equation 2, as described below. For example, for each intervention level, if the intervention level is not the highest intervention level (e.g., third intervention level), an upgrade intervention level indicator can be calculated as below.

upgrade intervention level=RetryAck counter
408a>RetryAckUpGradeValue[IL]|RetryGrant
counter 408b>RetryGrantUpGradeValue[IL]
|CreditedReq counter
408c>CreditedReqUpGradeValue[IL]|Ac-
kNoGrant counter
410a>AckNoGrantUpGradeValue[IL]|Re-
tryGrantNoReq counter
410b>RetryGrantNoReqUpGradeValue[IL]|Ac-
kNoReq counter
410c>AckNoReqUpGradeValue[IL]|External
retry monitor IL 424>ExtILUpGradeValue[IL]    Equation (1)

Similarly, for each intervention level, if the intervention level is not the lowest intervention level (e.g., zero intervention level), a downgrade intervention level indicator can be calculated as below.

downgrade intervention level=RetryAck counter
408a<RetryAckDnGradeValue[IL]|RetryGrant
counter 408b<RetryGrantDnGradeValue[IL]
|CreditedReq counter
408c<CreditedReqDnGradeValue[IL]|Ac-
kNoGrant counter
410a<AckNoGrantDnGradeValue[IL]|Re-
tryGrantNoReq counter
410b<RetryGrantNoReqDnGradeValue[IL]|Ac-
kNoReq counter
410c<AckNoReqDnGradeValue[IL]|External
retry monitor IL 424<ExtILDnGradeValue[IL]    Equation (2)

The RetryAckUpGradeValue[IL], the RetryGrantUpGradeValue[IL], the CreditedReqUpGradeValue[IL], the AckNoGrantUpGradeValue[IL], the RetryGrantNoReqUpGradeValue[IL], the AckNoReqUpGradeValue[IL], and the ExtILUpGradeValue[IL] may include corresponding upgrade threshold values for each intervention level other than the highest intervention level, and can be programmed in the retry configuration registers 416. The RetryAckDnGradeValue[IL], the RetryGrantDnGradeValue[IL], the CreditedReqDnGradeValue[IL], the AckNoGrantDnGradeValue[IL], the RetryGrantNoReqDnGradeValue[IL], the AckNoReqDnGradeValue[IL], and the ExtILDnGradeValue[IL] may include corresponding downgrade threshold values for each intervention level other than the lowest intervention level, and can be programmed in the retry configuration registers 416.

Figure 6:
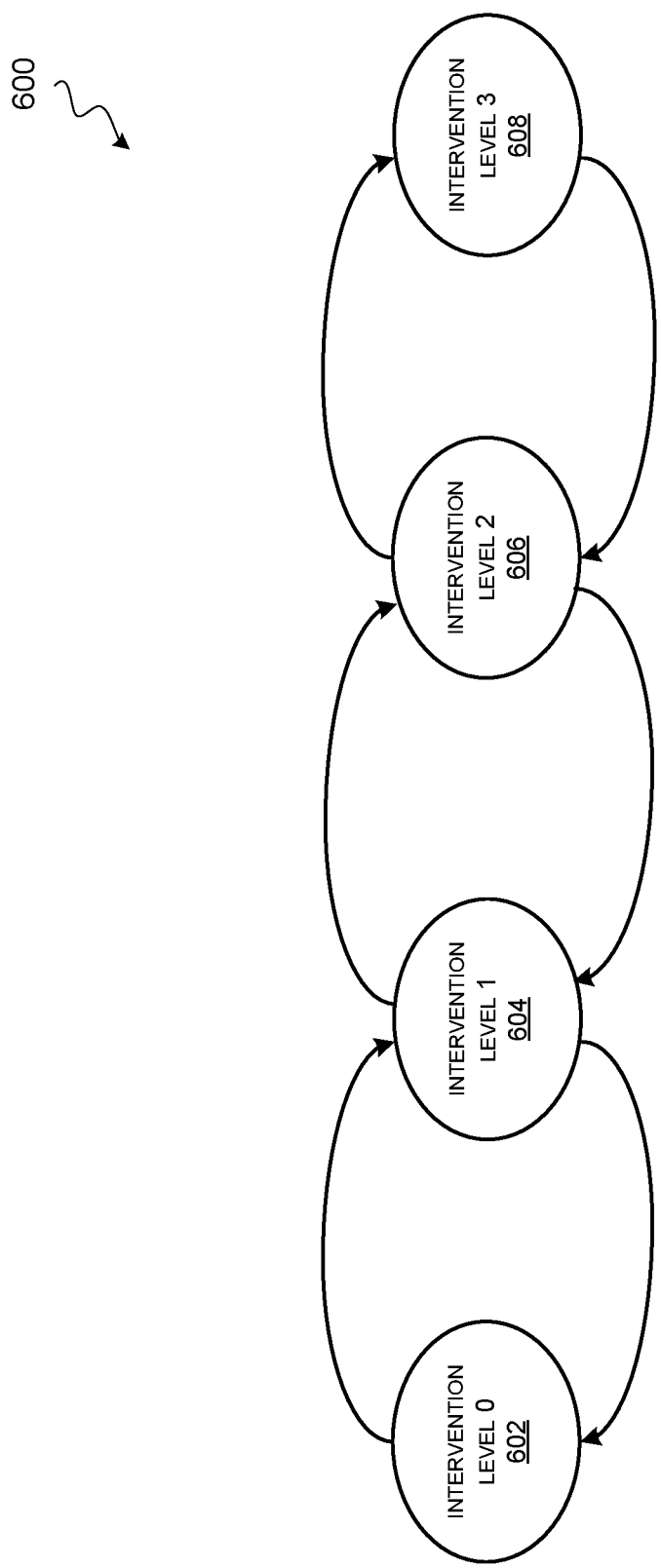
FIG. 6 illustrates an example state machine, which can be used to upgrade or downgrade the intervention levels, according to some embodiments.

FIG. 6 illustrates an example state machine 600, which can be used to upgrade or downgrade the intervention levels, according to some embodiments. The example state machine 600 can be executed by the intervention level generator 412. Note that some embodiments are described using four intervention levels; however, it will be understood that any number of intervention levels can be supported within the scope of the disclosure.

The example state machine 600 can initially be in a state 602 (e.g., default state), which may represent the intervention level 0 indicating that no intervention is needed. At the end of a given interval window, the state machine 600 may transition from the state 602 to a state 604 if the upgrade intervention level is asserted based on the upgrade intervention level indicator from Equation 1. The state 604 may represent the intervention level 1 indicating that low intervention is needed. In the state 604, at the end of a given interval window, the state machine 600 may transition to a state 606, if the upgrade intervention level is asserted based on the upgrade intervention level indicator, or back to the state 602, if the downgrade intervention level is asserted based on the downgrade intervention level indicator from Equation 2. The state 606 may represent the intervention level 2 indicating that medium intervention is needed. In the state 606, at the end of a given interval window, the state machine 600 may transition to a state 608, if the upgrade intervention level is asserted based on the upgrade intervention level indicator, or back to the state 604, if the downgrade intervention level is asserted based on the downgrade intervention level indicator. The state 608 may represent the intervention level 3 indicating that high intervention is needed. In the state 608, at the end of a given interval window, the state machine 600 may transition back to the state 606, if the downgrade intervention level is asserted based on the downgrade intervention level indicator.

Thus, the intervention level may only be allowed to go up or down by one level at a time during each interval window. The upgrade threshold values to transition from the current intervention level to the next intervention level can be different than the downgrade threshold values to transition from the next intervention level to the current intervention level, which can create a hysteresis. This is further described with reference to FIG. 7.

Figure 7:
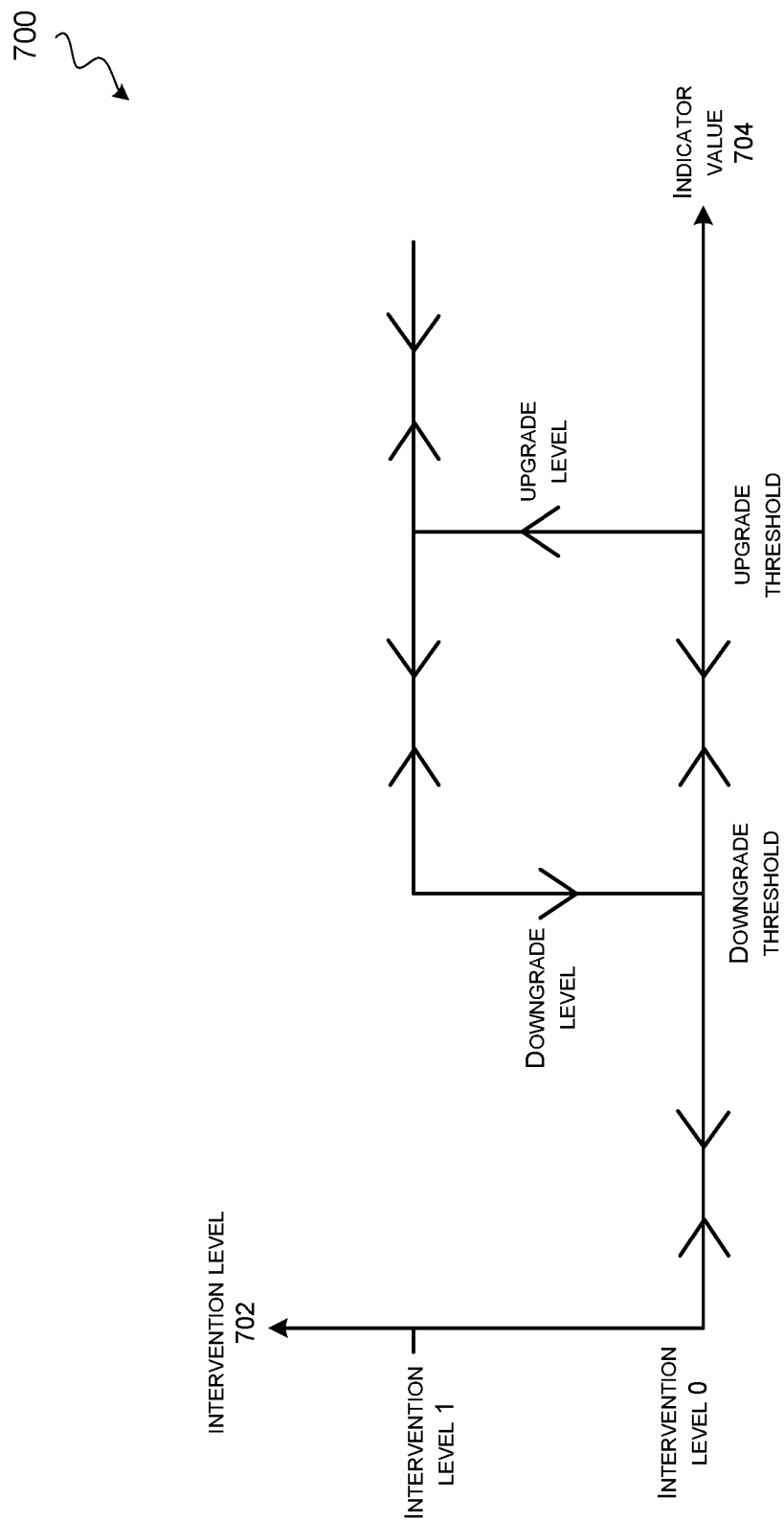
FIG. 7 illustrates an example of a hysteresis in intervention level transitions created by having different upgrade and downgrade threshold values, according to some embodiments.

FIG. 7 illustrates an example of a hysteresis in intervention level transitions created by having different upgrade and downgrade threshold values, according to some embodiments.

As shown in FIG. 7, an intervention level 702 can be upgraded from the intervention level 0 to the intervention level 1, or downgraded from the intervention level 1 to the intervention level 0 based on an indicator value 704. The indicator value 704 can correspond to any of the counter values or the External retry monitor IL values used in Equation 1 and Equation 2. However, any event, measurement, or calculations in the intervention level generator 404 can be used. As an example, the indicator value 704 can correspond to the value of the RetryAck counter 408a in FIG. 4. By programming an upgrade threshold value in the RetryAckUpGradeValue[IL]) that is different than a downgrade threshold value in the RetryAckDnGradeValue[IL], can create a hysteresis when transitioning between the intervention level 0 and the intervention level 1. Note that the hysteresis may be created when transitioning between any two consecutive intervention levels.

Figure 8:
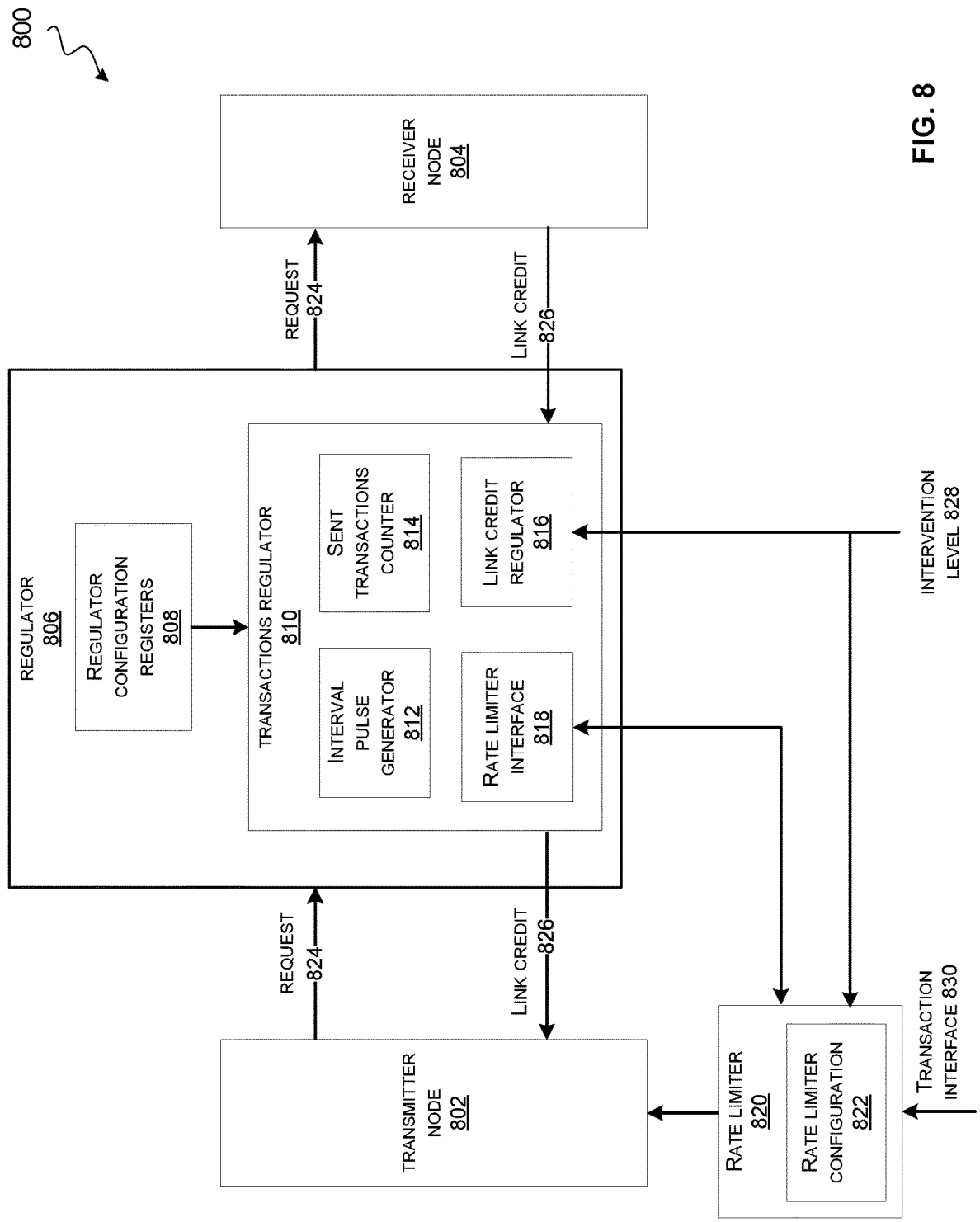
FIG. 8 illustrates an apparatus comprising circuits for a regulator coupled between a transmitter node and a receiver node to regulate the transactions requested by the requester, according to some embodiments.

FIG. 8 illustrates an apparatus 800 comprising circuits for a regulator 806 coupled between a transmitter node 802 and a receiver node 804 to regulate the transactions requested by the transmitter node 802, according to some embodiments. In some examples, the apparatus 800 can be part of the SoC described with reference to FIG. 3.

The regulator 806 can an example of the regulator 204, the first regulator 224, the second regulator 234, or the regulators 320, 312, and 306. The regulator 806 may include a transactions regulator 810 and regulator configuration registers 808. The transmitter node 802 can be the requester node 102 as described with reference to FIG. 2A, the first requester node 220, or the second requester node 230 as described with reference to FIGS. 2B and 2C, or one of the nodes from the RNFs 318 or the RNIs 308 as described with reference to FIG. 3. The receiver node 804 may include a crosspoint (XP), a switch, or a router, and can be part of the interconnect 210 or the interconnect 252. The receiver node 804 may also be coupled to a completer node, which can be the completer node 104 as described with reference to FIG. 2A, the first completer node 222, or the second completer node 232 as described with reference to FIGS. 2B and 2C, or one of the nodes from the HNFs 302 or the SNFs 314 as described with reference to FIG. 3.

The receiver node 804 may be configured to provide a link credit 826 to the transmitter node 802, which can be consumed by the transmitter node 802 to issue a transaction request 824. The receiver node 804 may have to accept the transaction request 824 which is sent by the transmitter node 802 using the link credit 826. Some embodiments can use the regulator 806 that is located between the transmitter node 802 and the receiver node 804 to hold the link credits that were issued by the receiver node 804 and release them to the transmitter node 802 according to a regulator configuration. By managing the link credits, the regulator 806 can control the bandwidth requirement of the transmitter node 802. In some examples, the receiver node 804 can be an XP in the CHI network that can issue a Link Layer Credit (L-Credit) to the transmitter node 802 to transfer a transaction packet. In various examples, a separate link credit can be issued for each channel of the CHI network.

The regulator configuration registers 808 may include a plurality of registers that can be programmed by the system software with threshold/configuration values that can be used by different components of the regulator 806. The transactions regulator 810 may include an interval pulse generator 812, a sent transactions counter 814, a link credit regulator 816, and a rate limiter interface 818. The interval pulse generator 812 may be similar to the interval pulse generator 414 and can be used to generate an interval pulse based on an interval configuration programmed in the regulator configuration registers 808. The interval pulse can be used to count the number of transaction requests sent by the transmitter node 802. The sent transactions counter 814 may be configured to count the number of requests 824 sent by the transmitter node 802 during each interval window, and reset the sent transactions counter 814 at the end of each interval window.

The link credit regulator 816 may be configured to regulate the transactions being requested by the transmitter node 802 based on the intervention level 828, value of the sent transactions counter 814, and a regulator configuration from the regulator configuration registers 808. For example, the link credit regulator 816 may determine, in each clock cycle, whether a rate limiter 820 has to be activated/deactivated, a rate limiter configuration 822 of the rate limiter 820 needs to be changed, to block the transaction requests till the end of the interval window by holding back all the link credits received during this interval window, or to not impose any regulations. In some examples, to prevent dead lock/performance degradation, the link credit regulator 816 may provide the link credits 826 to the transmitter node 802 to allow the transmitter node 802 to send the credited request 112 for the credited transactions instead of blocking those transactions.

The rate limiter interface 818 may be configured to provide an interface to the rate limiter 820 to activate or deactivate the rate limiter 820, or indicate to the rate limiter 820 to change the rate limiter configuration 822 based on the intervention level 828. The rate limiter configuration 822 may be used to control the transactions arriving at the transmitter node 802 via a transaction interface 830. The transaction interface 830 may be part of another interconnect that is based on another bus protocol, e.g., AXI, AHB, or APB protocol. As an example, for the AXI bus protocol, the VALID/READY signals can be controlled to control the rate of transactions arriving at the transmitter node 802.

Figure 9:
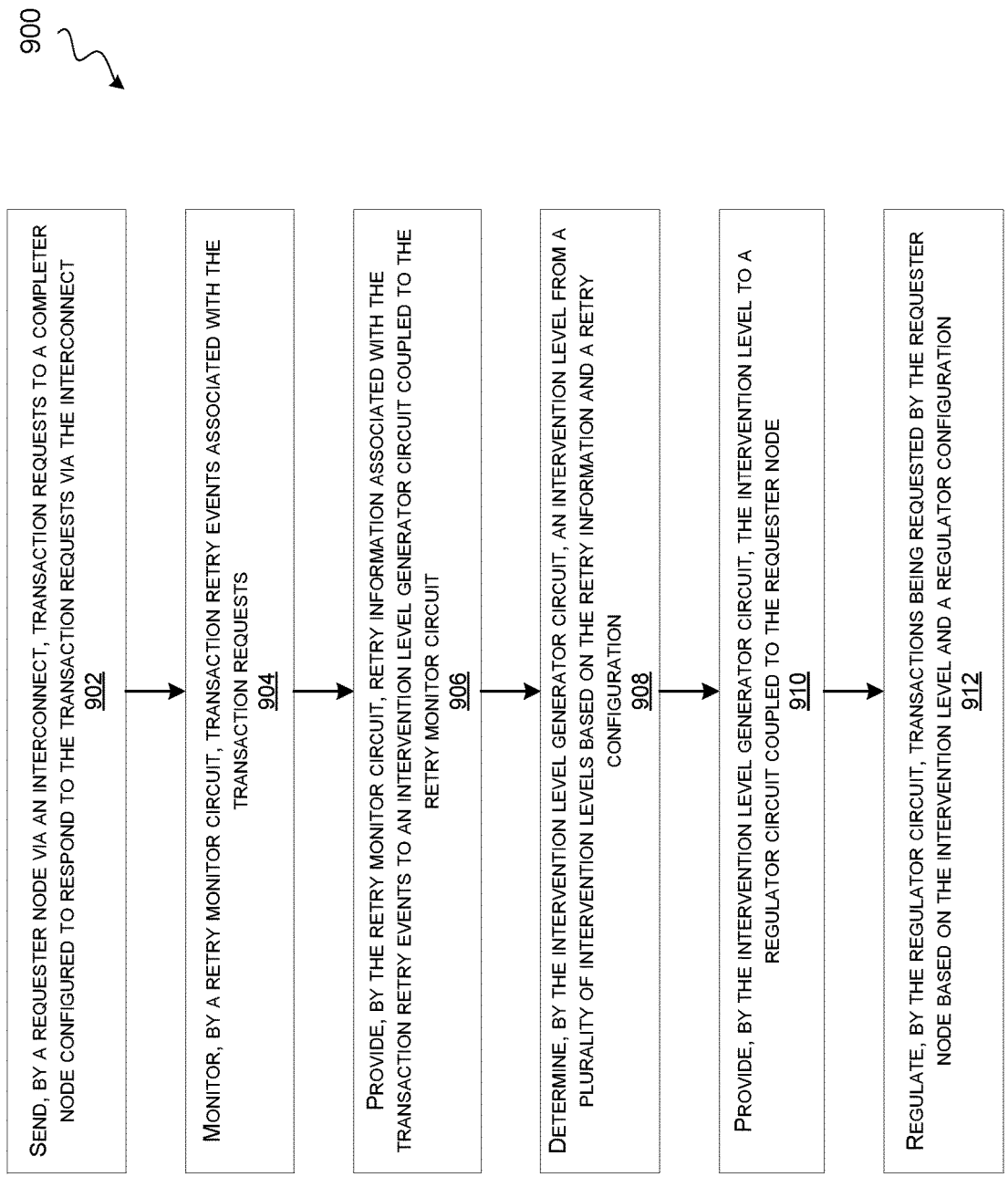
FIG. 9 illustrates an example flowchart for a method executed by an integrated circuit (IC) device, according to some embodiments.

FIG. 9 illustrates an example flowchart 900 for a method executed by an IC device, according to some embodiments. The IC device can be an SoC as described with reference to FIGS. 2A, 2B, 2C and 3.

In step 902, the method includes sending, by a requester node via an interconnect, transaction requests to a completer node configured to respond to the transaction requests via the interconnect. For example, the requester node 102 may send the request 106 to the completer node 104 via the interconnect 210.

In step 904, the method includes monitoring, by a retry monitor circuit, transaction retry events associated with the transaction requests. The retry monitor 206 may monitor the transaction retry events at the completer node 104. For example, the retry monitor 206 may monitor the retry ack response 108 sent by the completer node 104, the retry grant response 110 sent by the completer node 104, and the credited request 112 received by the completer node 104.

In step 906, the method includes providing, by the retry monitor circuit, retry information associated with the transaction retry events to an intervention level generator circuit coupled to the retry monitor circuit. The retry monitor 206 may provide the retry information 212 to the intervention level generator 202.

In step 908, the method includes determining, by the intervention level generator circuit, an intervention level from a plurality of intervention levels based on the retry information and a retry configuration. The intervention level generator 202 may determine the intervention level 214 from the plurality of intervention levels based on the retry information 212 and the retry configuration stored in the retry configuration registers 416. As discussed with reference to FIG. 4, the intervention level generator 412 may generate the intervention level 422 based on the combination counters 410 and the interval counters 408, the interval pulses generated by the interval pulse generator 414, the external retry monitor IL 424, and the retry configuration registers 416.

In step 910, the method includes providing, by the intervention level generator circuit, the intervention level to a regulator circuit coupled to the requester node. The intervention level generator 202 may provide the intervention level 214 to the regulator 204. The regulator 204 may forward the intervention level 214 to the rate limiter 208 to regulate a rate of transactions arriving at the requester node 102 based on the intervention level 214 and the rate limiter configuration 822.

In step 912, the method includes regulating, by the regulator circuit, transactions being requested by the requester node based on the intervention level and a regulator configuration. The regulator 204 may regulate the transactions being requested by the requester node 104 based on the intervention level 214 and a regulator configuration stored in the regulator configuration registers 808.

In some examples, the method described with reference to FIG. 9 can be executed to regulate the transactions being requested by the first requester node 220 or the second requester node 230 described with reference to FIGS. 2B and 2C. Thus, by monitoring the transaction retry requests at the requester node or at the completer node, and regulating/limiting the transactions at the requester node can allow the completer node to complete the outstanding transactions, which can make the storage resources available for the new transaction requests and minimize the retry requests. Having multiple intervention level generators can allow controlling the transaction requests between different sections of the interconnect using separate intervention levels, and, therefore, preventing the system to reach the failing point or have performance degradation.

Figure 10:
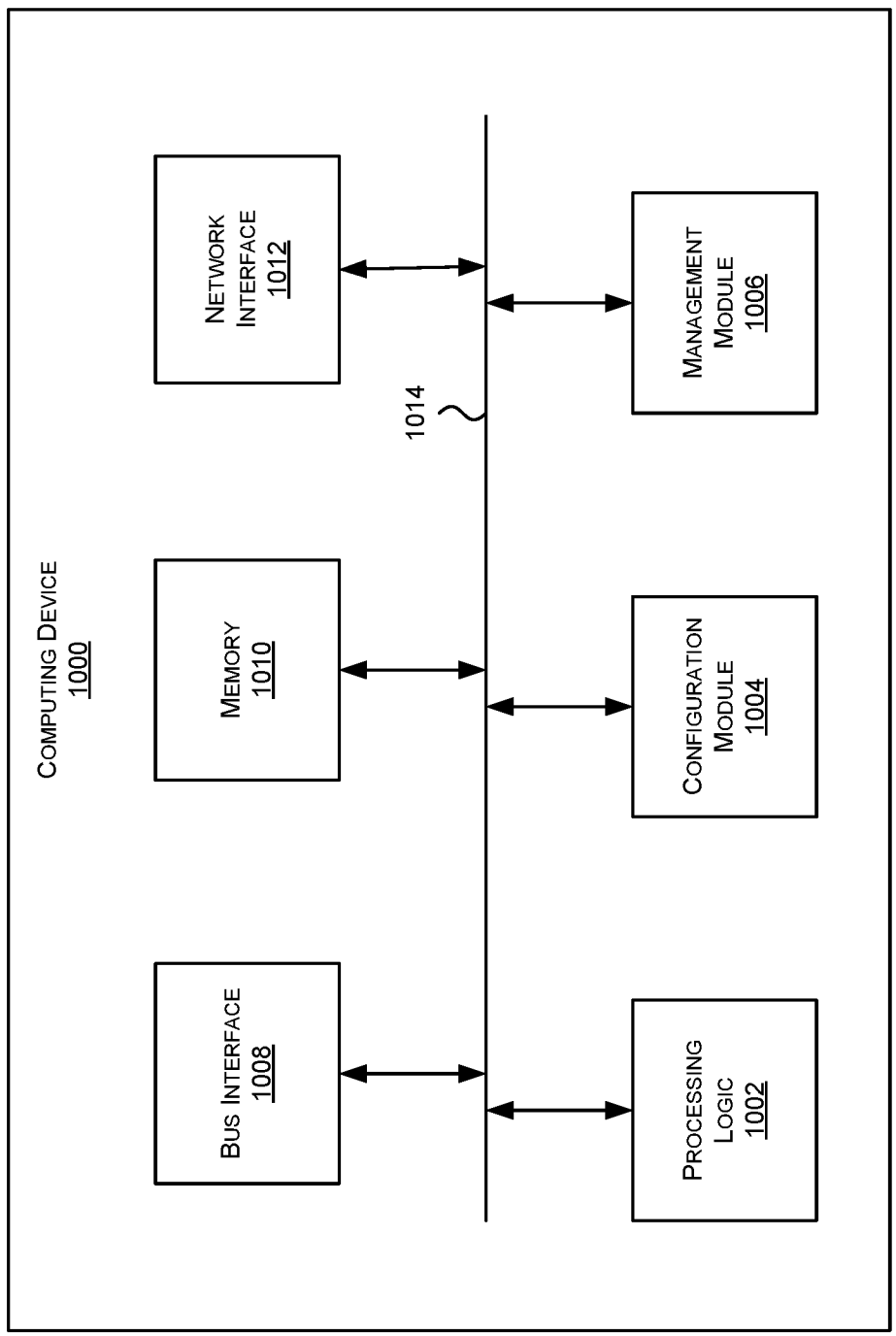
FIG. 10 illustrates an example of a computing device, according to certain aspects of the disclosure.

FIG. 10 illustrates an example of a computing device 1000. Functionality and/or several components of the computing device 1000 may be used without limitation with other embodiments disclosed elsewhere in this disclosure, without limitations, e.g., with reference to FIGS. 1-8. A computing device 1000 may facilitate processing of packets and/or forwarding of packets from the computing device 1000 to another device. As referred to herein, a "packet" or "network packet" may refer to a variable or fixed unit of data. In some instances, a packet may include a packet header and a packet payload. The packet header may include information associated with the packet, such as the source, destination, quality of service parameters, length, protocol, routing labels, error correction information, etc. In certain implementations, one packet header may indicate information associated with a series of packets, such as a burst transaction. In some implementations, the computing device 1000 may be the recipient and/or generator of packets. In some implementations, the computing device 1000 may modify the contents of the packet before forwarding the packet to another device. The computing device 1000 may be a peripheral device coupled to another computer device, a switch, a router or any other suitable device enabled for receiving and forwarding packets.

In one example, the computing device 1000 may include processing logic 1002, a configuration module 1004, a management module 1006, a bus interface module 1008, memory 1010, and a network interface module 1012. These modules may be hardware modules, software modules, or a combination of hardware and software. In certain instances, modules may be interchangeably used with components or engines, without deviating from the scope of the disclosure. The computing device 1000 may include additional modules, which are not illustrated here. In some implementations, the computing device 1000 may include fewer modules. In some implementations, one or more of the modules may be combined into one module. One or more of the modules may be in communication with each other over a communication channel 1014. The communication channel 1014 may include one or more busses, meshes, matrices, fabrics, a combination of these communication channels, or some other suitable communication channel.

The processing logic 1002 may include application specific integrated circuits (ASICs), field programmable gate arrays (FPGAs), systems-on-chip (SoCs), network processing units (NPUs), processors configured to execute instructions or any other circuitry configured to perform logical arithmetic and floating point operations. Examples of processors that may be included in the processing logic 1002 may include processors developed by ARM®, MIPS®, AMD®, Intel®, Qualcomm®, and the like. In certain implementations, processors may include multiple processing cores, wherein each processing core may be configured to execute instructions independently of the other processing cores. Furthermore, in certain implementations, each processor or processing core may implement multiple processing threads executing instructions on the same processor or processing core, while maintaining logical separation between the multiple processing threads. Such processing threads executing on the processor or processing core may be exposed to software as separate logical processors or processing cores. In some implementations, multiple processors, processing cores or processing threads executing on the same core may share certain resources, such as for example busses, level 1 (L1) caches, and/or level 2 (L2) caches. The instructions executed by the processing logic 1002 may be stored on a computer-readable storage medium, for example, in the form of a computer program. The computer-readable storage medium may be non-transitory. In some cases, the computer-readable medium may be part of the memory 1010.

The memory 1010 may include either volatile or non-volatile, or both volatile and non-volatile types of memory. The memory 1010 may, for example, include random access memory (RAM), read only memory (ROM), Electrically Erasable Programmable Read-Only Memory (EEPROM), flash memory, and/or some other suitable storage media. In some cases, some or all of the memory 1010 may be internal to the computing device 1000, while in other cases some or all of the memory may be external to the computing device 1000. The memory 1010 may store an operating system comprising executable instructions that, when executed by the processing logic 1002, provides the execution environment for executing instructions providing networking functionality for the computing device 1000. The memory may also store and maintain several data structures and routing tables for facilitating the functionality of the computing device 1000.

In some implementations, the configuration module 1004 may include one or more configuration registers. Configuration registers may control the operations of the computing device 1000. In some implementations, one or more bits in the configuration register can represent certain capabilities of the computing device 1000. Configuration registers may be programmed by instructions executing in the processing logic 1002, and/or by an external entity, such as a host device, an operating system executing on a host device, and/or a remote device. The configuration module 1004 may further include hardware and/or software that control the operations of the computing device 1000.

In some implementations, the management module 1006 may be configured to manage different components of the computing device 1000. In some cases, the management module 1006 may configure one or more bits in one or more configuration registers at power up, to enable or disable certain capabilities of the computing device 1000. In certain implementations, the management module 1006 may use processing resources from the processing logic 1002. In other implementations, the management module 1006 may have processing logic similar to the processing logic 1002, but segmented away or implemented on a different power plane than the processing logic 1002.

The bus interface module 1008 may enable communication with external entities, such as a host device and/or other components in a computing system, over an external communication medium. The bus interface module 1008 may include a physical interface for connecting to a cable, socket, port, or other connection to the external communication medium. The bus interface module 1008 may further include hardware and/or software to manage incoming and outgoing transactions. The bus interface module 1008 may implement a local bus protocol, such as Peripheral Component Interconnect (PCI) based protocols, Non-Volatile Memory Express (NVMe), Advanced Host Controller Interface (AHCI), Small Computer System Interface (SCSI), Serial Attached SCSI (SAS), Serial AT Attachment (SATA), Parallel ATA (PATA), some other standard bus protocol, or a proprietary bus protocol. The bus interface module 1008 may include the physical layer for any of these bus protocols, including a connector, power management, and error handling, among other things. In some implementations, the computing device 1000 may include multiple bus interface modules for communicating with multiple external entities. These multiple bus interface modules may implement the same local bus protocol, different local bus protocols, or a combination of the same and different bus protocols.

The network interface module 1012 may include hardware and/or software for communicating with a network. This network interface module 1012 may, for example, include physical connectors or physical ports for wired connection to a network, and/or antennas for wireless communication to a network. The network interface module 1012 may further include hardware and/or software configured to implement a network protocol stack. The network interface module 1012 may communicate with the network using a network protocol, such as for example TCP/IP, Infiniband, RoCE, Institute of Electrical and Electronics Engineers (IEEE) 902.11 wireless protocols, User Datagram Protocol (UDP), Asynchronous Transfer Mode (ATM), token ring, frame relay, High Level Data Link Control (HDLC), Fiber Distributed Data Interface (FDDI), and/or Point-to-Point Protocol (PPP), among others. In some implementations, the computing device 1000 may include multiple network interface modules, each configured to communicate with a different network. For example, in these implementations, the computing device 1000 may include a network interface module for communicating with a wired Ethernet network, a wireless 902.11 network, a cellular network, an Infiniband network, etc.

The various components and modules of the computing device 1000, described above, may be implemented as discrete components, as a System on a Chip (SoC), as an ASIC, as an NPU, as an FPGA, or any combination thereof. In some embodiments, the SoC or other component may be communicatively coupled to another computing system to provide various services such as traffic monitoring, traffic shaping, computing, etc. In some embodiments of the technology, the SoC or other component may include multiple subsystems.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 9, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A system-on-a-chip (SoC) comprising:
an interconnect;
a plurality of requester nodes configured to send transaction requests via the interconnect;
a plurality of regulator circuits respectively coupled to the plurality of requester nodes;
a plurality of completer nodes configured to respond to the transaction requests via the interconnect;
a plurality of retry monitor circuits respectively coupled to the plurality of completer nodes; and
a central intervention level generator circuit coupled to the plurality of regulator circuits and the plurality of retry monitor circuits, the central intervention level generator circuit comprising:
  interval counters for counting transaction retry events associated with each of the plurality of completer nodes; and
  combination counters for counting combinations of two different transaction retry events associated with each of the plurality of completer nodes,
wherein each of the plurality of retry monitor circuits is configured to:
  monitor transaction retry events of a corresponding completer node; and
  provide retry information associated with the transaction retry events of the corresponding completer node to the central intervention level generator circuit,
wherein the central intervention level generator circuit is configured to:
  receive the corresponding retry information from each of the plurality of retry monitor circuits;
  update the interval counters and the combination counters based on the corresponding retry information from each of the plurality of retry monitor circuits; and
  determine an intervention level from a plurality of intervention levels for each of the regulator circuits based on the interval counters, combination counters, and a retry configuration, and
wherein each of the plurality of regulator circuits is configured to:
  receive the intervention level for the corresponding regulator circuit from the central intervention level generator circuit; and
  regulate transactions being requested by a corresponding requester node based on the intervention level and a respective regulator configuration.

2. The SoC of claim 1, wherein the SoC further comprises:
a plurality of rate limiter circuits respectively coupled to the plurality of regulator circuits, each of the plurality of rate limiter circuits comprising a respective rate limiter configuration, wherein regulating the transactions being requested by a requester node includes one of:
  determining whether a corresponding rate limiter circuit needs to be activated or deactivated to control a rate of transactions arriving at the requester node;
  changing the rate limiter configuration based on the intervention level; or
  blocking the transactions being requested by the corresponding requester node.

3. The SoC of claim 1, wherein the central intervention level generator circuit further comprises:
an interval pulse generator configured to generate an interval pulse at a periodic interval, wherein the interval counters get reset at an end of each interval pulse.

4. The SoC of claim 1, wherein the plurality of intervention levels includes a first intervention level indicating no intervention is needed, a second intervention level indicating low intervention is needed, a third intervention level indicating medium intervention is needed, and a fourth intervention level indicating high intervention is needed.

5. An integrated circuit (IC) device comprising:
an interconnect;
a requester node configured to send transaction requests via the interconnect;
a regulator circuit coupled to the requester node;
a completer node configured to respond to the transaction requests via the interconnect;
a retry monitor circuit configured to monitor transaction retry events associated with the transaction requests to provide retry information; and
an intervention level generator circuit coupled to the regulator circuit and the retry monitor circuit,
wherein the intervention level generator circuit is configured to:
  receive the retry information from the retry monitor circuit; and
  determine an intervention level from a plurality of intervention levels based on the retry information and a retry configuration, and
wherein the regulator circuit is configured to:
  receive the intervention level from the intervention level generator circuit; and
  regulate transactions being requested by the requester node based on the intervention level and a regulator configuration.

6. The IC device of claim 5, wherein the intervention level generator is a central intervention level generator configured to receive retry information from a plurality of retry monitor circuits, and determine respective intervention levels for a plurality of regulator circuits.

7. The IC device of claim 5, wherein the intervention level generator is a dedicated intervention level generator of the regulator circuit of the requester node.

8. The IC device of claim 5, wherein the retry monitor circuit is configured to monitor the transaction retry events at the requester node.

9. The IC device of claim 5, wherein the retry monitor circuit is configured to monitor the transaction retry events at the completer node.

10. The IC device of claim 5, wherein the transaction retry events include a retry acknowledge sent by the completer node in response to a transaction request indicating that the completer node is unable to accept the transaction request, a retry grant response sent by the completer node after sending the retry acknowledge indicating that the completer node is now able to accept the transaction request, and a retry request received by the completer node from the requester node after receiving the retry grant response.

11. The IC device of claim 10, wherein the retry information includes information associated with the retry acknowledge, the retry grant response, and the retry request for each transaction request the completer node is unable to accept.

12. The IC device of claim 10, wherein the regulator circuit regulates the transactions being requested by the requester node by limiting link credits allocated to the requester node for sending the transaction requests.

13. The IC device of claim 12, wherein the regulator circuit allows a transaction with the retry request which was previously not accepted by the completer node.

14. The IC device of claim 5, wherein the regulator circuit is further configured to:
  send the intervention level received from the intervention level generator circuit to a rate limiter circuit, wherein the rate limiter circuit is configured to regulate a rate of transactions arriving at the requester node via a different interconnect based on the intervention level and a rate limiter configuration.

15. The IC device of claim 9, wherein the completer node is a home node that is configured to operate as another requester node to another completer node, the IC device further comprising another regulator circuit coupled to the home node and another retry monitor circuit configured to monitor transaction retry events at the other completer node.

16. The IC device of claim 15, wherein the intervention level generator circuit is further configured to:
  receive an external intervention level provided by another intervention level generator circuit coupled to the other regulator circuit and the other retry monitor circuit,
  wherein the intervention level generator circuit further determines the intervention level from the plurality of intervention levels based on the external intervention level.

17. The IC device of claim 5, wherein the requester node is a home node.

18. The IC device of claim 5, wherein the interconnect is based on a Coherent Hub Interface (CHI) protocol.

19. A method performed by an integrated circuit (IC) device, comprising:
  sending, by a requester node via an interconnect, transaction requests to a completer node configured to respond to the transaction requests via the interconnect;
  monitoring, by a retry monitor circuit, transaction retry events associated with the transaction requests;
  providing, by the retry monitor circuit, retry information associated with the transaction retry events to an intervention level generator circuit coupled to the retry monitor circuit;
  determining, by the intervention level generator circuit, an intervention level from a plurality of intervention levels based on the retry information and a retry configuration;
  providing, by the intervention level generator circuit, the intervention level to a regulator circuit coupled to the requester node; and
  regulating, by the regulator circuit, transactions being requested by the requester node based on the intervention level and a regulator configuration.

20. The method of claim 19, further comprising:
  forwarding, by the regulator circuit, the intervention level to a rate limiter circuit coupled to the requester node and another interconnect; and
  regulating, by the rate limiter circuit, a rate of transactions arriving at the requester node based on the intervention level and a rate limiter configuration.

21. The method of claim 19, wherein the regulator circuit regulates the transactions being requested by the requester node by limiting link credits allocated to the requester node for sending the transaction requests.

22. The method of claim 19, further comprising:
  sending, by the intervention level generator circuit, the intervention level to another intervention level generator circuit, wherein the other intervention level generator circuit is coupled to another retry monitor circuit, and to another regulator circuit coupled to the completer node that is operating as another requester node for the other completer node.

23. The method of claim 22, further comprising:
  receiving, by the intervention level generator circuit, another intervention level provided by the other intervention level generator circuit,
  wherein the intervention level generator circuit further determines the intervention level from the plurality of intervention levels based on the other intervention level.

24. The method of claim 19, wherein determining, by the intervention level generator circuit, the intervention level from the plurality of intervention levels includes:
  generating, by an interval pulse generator, an interval pulse every pre-determined number of clock cycles;
  counting, using interval counters, each of the transaction retry events based on consecutive interval pulses;
  counting, using combination counters, combinations of two different transaction retry events; and
  determining the intervention level from the plurality of intervention levels based on the interval counters and the combination counters.

* * * * *